(12) United States Patent
Takatsu

(10) Patent No.: US 10,637,382 B2
(45) Date of Patent: Apr. 28, 2020

(54) MOTOR CONTROL APPARATUS, SHEET CONVEYANCE APPARATUS, AND IMAGE FORMING APPARATUS

(71) Applicant: CANON KABUSHIKI KAISHA, Tokyo (JP)

(72) Inventor: Junya Takatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/262,614

(22) Filed: Jan. 30, 2019

(65) Prior Publication Data

US 2019/0260320 A1 Aug. 22, 2019

(30) Foreign Application Priority Data

Feb. 16, 2018 (JP) .................................. 2018-026352

(51) Int. Cl.

| G01R 31/02 | (2006.01) |
| H02H 3/04 | (2006.01) |
| H02H 7/08 | (2006.01) |
| H02P 21/22 | (2016.01) |
| G03G 15/00 | (2006.01) |
| H02P 21/18 | (2016.01) |
| H04N 1/00 | (2006.01) |

(52) U.S. Cl.
CPC ......... *H02P 21/22* (2016.02); *G03G 15/5004* (2013.01); *G03G 15/6508* (2013.01); *G03G 15/80* (2013.01); *H02P 21/18* (2016.02); *H04N 1/00* (2013.01); *G03G 15/6529* (2013.01); *G03G 2215/00632* (2013.01); *G03G 2215/00679* (2013.01)

(58) Field of Classification Search
CPC .................................. H02P 21/22; H02P 21/18
USPC ......................................................... 318/490
See application file for complete search history.

(56) References Cited

U.S. PATENT DOCUMENTS 8,970,146 B2 3/2015 Pollock

FOREIGN PATENT DOCUMENTS

JP 200539955 A 2/2005

*Primary Examiner* — Erick D Glass
(74) *Attorney, Agent, or Firm* — Canon U.S.A., Inc. IP Division

(57) ABSTRACT

An apparatus to control a motor includes a detector that detects a driving current flowing through a motor winding, phase determiner that determines a motor rotor rotation phase based on the detected driving current, generator that generates an instructed phase, and controller. The controller includes a first mode where controlling the driving current flowing through the motor winding controls the motor based on a torque current component value such that a deviation between the generated instructed phase and the determined rotation phase is reduced, and a second mode in which a current of a predetermined magnitude controls the motor. The torque current component is expressed in a rotating coordinate system based on determined rotation phase. The generator generates, based on the rotation phase determined while executing second mode, the instructed phase in the first mode when a controlling driving current mode is switched from the second to the first mode.

19 Claims, 12 Drawing Sheets

MOTOR CONTROL APPARATUS, SHEET CONVEYANCE APPARATUS, AND IMAGE FORMING APPARATUS

BACKGROUND

Field

The present disclosure relates to control of motors of motor control apparatuses, sheet conveyance apparatuses, and image forming apparatuses.

Description of the Related Art

Vector control is a known conventional method for controlling a motor by controlling a current value in a rotating coordinate system based on the rotation phase of a rotor of the motor. Specifically, a method for controlling a motor is known in which a current value in a rotating coordinate system is controlled by phase feedback control such that the deviation between an instructed phase and a rotation phase of a rotor is reduced. Further, another method for controlling a motor is also known in which a current value in a rotating coordinate system is controlled by speed feedback control such that the deviation between an instructed speed and a rotation speed of a rotor is reduced.

In the vector control, a driving current that flows in a winding wire of a motor is expressed by q-axis and d-axis components. The q-axis component (torque current component) is a current component that generates a torque for a rotor to rotate. The d-axis component (excitation current component) is a current component that affects the intensity of a magnetic flux through the winding wire of the motor. The value of the torque current component is controlled according to a change in load torque applied to the rotor, whereby a necessary torque for rotation is efficiently generated. This prevents an increase in motor sound and power consumption caused by a surplus torque, and also prevents a situation that the load torque applied to the rotor exceeds an output torque corresponding to the driving current supplied to the winding wire of the motor and thus the rotor no longer synchronizes with an input signal to thereby cause the motor to be in an uncontrollable state (out-of-synchronism state).

In the vector control, a configuration for determining the rotation phase of a rotor is necessary. U.S. Pat. No. 8,970,146 discusses a configuration in which the rotation phase of a rotor is determined based on an induced voltage generated in a winding wire of each phase of a motor by rotation of the rotor.

The lower the rotation speed of the rotor is, the smaller the magnitude of the induced voltage generated in the winding wire becomes. If the magnitude of the induced voltage generated in the winding wire is not large enough for the rotation phase of the rotor to be determined, accurate determination of the rotation phase may be difficult. Specifically, the lower the rotation speed of the rotor is, the lower the accuracy of determination of the rotation phase of the rotor is likely to become.

In view of the foregoing, Japanese Patent Application Laid-Open No. 2005-39955 discusses a system that uses constant current control in which a motor is controlled by supplying a predetermined current to a winding wire of the motor in a case in which the instructed speed of a rotor is lower than a predetermined rotation speed. In the constant current control, neither phase feedback control nor speed feedback control is performed. Japanese Patent Application Laid-Open No. 2005-39955 further discusses a configuration that uses the vector control in a case in which the instructed speed of a rotor is higher than or equal to a predetermined rotation speed.

FIG. 12 illustrates an example of the relationship between an instructed phase and a rotation phase of a rotor. In FIG. 12, the solid line represents the instructed phase with respect to a motor, whereas the broken line represents the rotation phase of the rotor. FIG. 12 illustrates the relationship between the instructed phase and the rotation phase of the rotor in a state in which the rotor is rotated at constant speed.

In the constant current control, the rotor is rotated in the state in which the phase difference between the instructed phase and the rotation phase of the rotor is a phase difference corresponding to the load torque applied to the rotor, as illustrated in FIG. 12. In the vector control, on the other hand, the rotor is rotated in the state in which the phase difference between the instructed phase and the rotation phase of the rotor is smaller than the phase difference in the constant current control, since the motor is controlled such that the deviation between the instructed phase and the rotation phase of the rotor is reduced.

At the time when motor control is switched from the constant current control to the vector control, the rotation speed of the motor may fluctuate momentarily. Specifically, as illustrated in FIG. 12, the rotation speed of the motor may fluctuate due to a decrease in the phase difference between the instructed phase and the rotation phase of the rotor at the time when motor control is switched from the constant current control to the vector control.

Further, the rotation speed of the motor may fluctuate momentarily at the time when motor control is switched from the vector control to the constant current control. Specifically, as illustrated in FIG. 12, the rotation speed of the motor may fluctuate due to an increase in the phase difference between the instructed phase and the rotation phase of the rotor at the time when motor control is switched from the vector control to the constant current control.

As described above, if the rotation speed of the motor fluctuates at the time when motor control is switched from the vector control to the constant current control, the motor control may become unstable.

SUMMARY OF THE INVENTION

The present disclosure is directed to a technique for preventing motor control from becoming unstable at the time of switching a control mode for motor control.

According to an aspect of the present disclosure, a motor control apparatus to control a motor based on an instructed phase indicating a target phase of a rotor of the motor includes a detector configured to detect a driving current flowing through a winding of the motor, a phase determiner configured to determine a rotation phase of the rotor based on the driving current detected by the detector, a generator configured to generate the instructed phase, and a controller including a first control mode, in which the motor is controlled by controlling the driving current flowing through the winding of the motor based on a value of a torque current component such that a deviation between the instructed phase generated by the generator and the rotation phase determined by the phase determiner is reduced, and a second control mode in which the motor is controlled based on a current of a predetermined magnitude, wherein the torque current component is expressed in a rotating coordinate system based on the rotation phase determined by the phase determiner, wherein the phase determiner is configured to determine the rotation phase even while the second control mode is executed, and wherein the generator generates, based on the rotation phase determined by the phase determiner while the second control mode is executed, the instructed phase in the first control mode in a case where a control mode for controlling the driving current is switched from the second control mode to the first control mode.

Further features of the present disclosure will become apparent from the following description of embodiments with reference to the attached drawings.

DESCRIPTION OF THE EMBODIMENTS

Various embodiments of the present disclosure will be described below with reference to the drawings. It should be noted that the shapes, relative positions, etc. of components described in the embodiments are to be changed as appropriate according to the configuration of an apparatus to which the disclosure is applied and various conditions, and the embodiments described below are not intended to limit the scope of the disclosure. Further, while the following describes a case in which a motor control apparatus is provided to an image forming apparatus, an apparatus to which a motor control apparatus is to be provided is not limited to an image forming apparatus. For example, a motor control apparatus is also used in a sheet conveyance apparatus configured to convey a recording medium, a sheet such as a document, etc.

[Image Forming Apparatus]

Figure 1:
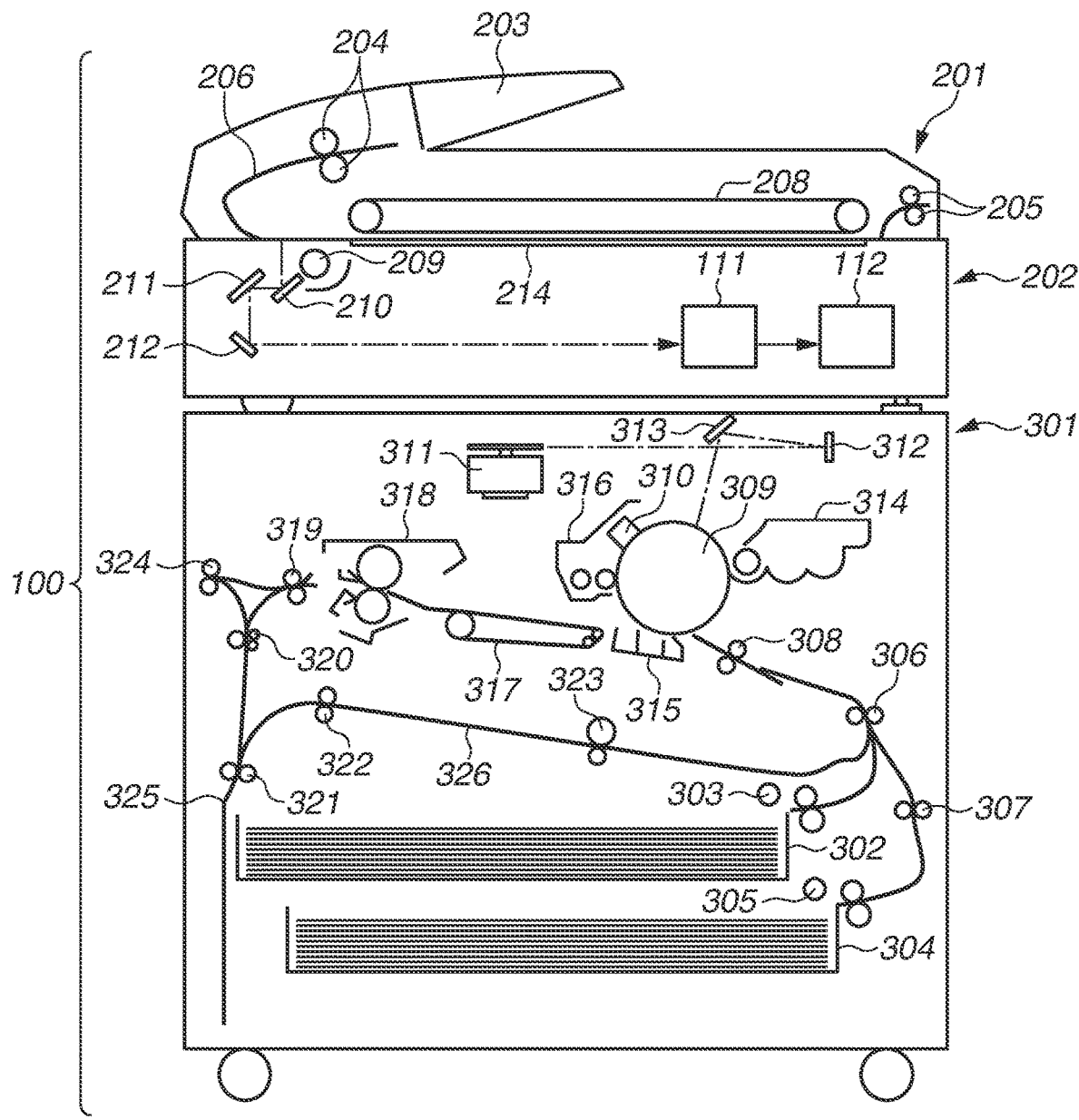
FIG. 1 is a cross-sectional diagram illustrating an image forming apparatus.

The following describes a first embodiment. FIG. 1 is a cross-sectional view illustrating a configuration of a monochrome electrophotographic copying machine (hereinafter, "image forming apparatus") 100 including a sheet conveyance apparatus used in the present embodiment. The image forming apparatus 100 is not limited to a copying machine and can be, for example, a facsimile apparatus, printing machine, and printer. Further, the recording method is not limited to an electrophotographic method and can be, for example, an inkjet method. Further, the image forming apparatus 100 can be either one of a monochrome image forming apparatus and a color image forming apparatus.

The following describes the configuration and function of the image forming apparatus 100 with reference to FIG. 1. As illustrated in FIG. 1, the image forming apparatus 100 includes a document feeding apparatus 201, a reading apparatus 202, and an image printing apparatus 301.

A document stacked on a document stacking portion 203 of the document feeding apparatus 201 is fed by sheet feeding rollers 204 and conveyed along a conveyance guide 206 onto a document glass plate 214 of the reading apparatus 202. Further, the document is conveyed by a conveyance belt 208 and then discharged onto a sheet discharge tray (not illustrated) by sheet discharge rollers 205. Reflection light from a document image illuminated by an illumination system 209 at a reading position of the reading apparatus 202 is guided to an image reading unit 111 by an optical system formed by reflection mirrors 210, 211, and 212 and converted into an image signal by the image reading unit 111. The image reading unit 111 includes a lens, a charge-coupled device (CCD) sensor which is a photoelectric conversion element, and a CCD driving circuit. Various types of correction processing are performed on the image signal output from the image reading unit 111 by an image processing unit 112 including a hardware device such as an application-specific integrated circuit (ASIC), and the processed image signal is then output to the image printing apparatus 301. The document reading is performed as described above. Specifically, the document feeding apparatus 201 and the reading apparatus 202 each function as a document reading apparatus.

Further, a document reading mode includes a first reading mode and a second reading mode. The first reading mode is a mode in which the illumination system 209 and the optical system fixed at predetermined positions read an image of a document conveyed at constant speed. The second reading mode is a mode in which the illumination system 209 and the optical system moving at constant speed read an image of a document placed on the document glass plate 214 of the reading apparatus 202. In general, an image of a sheet-shaped document is read in the first reading mode, whereas an image of a bound document such as a book or booklet is read in the second reading mode.

Inside the image printing apparatus 301 are provided sheet storage trays 302 and 304. Different types of recording mediums can be stored in the respective sheet storage trays 302 and 304. For example, A4-size normal sheets are stored in the sheet storage tray 302, whereas A4-size thick sheets are stored in the sheet storage tray 304. The recording media are those on which an image is to be formed by the image forming apparatus 100, and examples of recording media include a sheet, resin sheet, cloth, overhead projector (OHP) sheet, and label.

The recording medium stored in the sheet storage tray 302 is fed by a pickup roller 303 and conveyed to a registration roller 308 by a conveyance roller 306. Further, the recording medium stored in the sheet storage tray 304 is fed by a pickup roller 305 and conveyed to the registration roller 308 by conveyance rollers 307 and 306.

The image signal output from the reading apparatus 202 is input to an optical scanning apparatus 311 which includes a semiconductor laser and a polygon mirror. Further, the outer surface of a photosensitive drum 309 is charged by a charger 310. After the outer surface of the photosensitive drum 309 is charged, laser light corresponding to the image signal input to the optical scanning apparatus 311 from the reading apparatus 202 travels from the optical scanning apparatus 311 through the polygon mirror and mirrors 312 and 313 and is radiated on the outer surface of the photosensitive drum 309. Consequently, an electrostatic latent image is formed on the outer surface of the photosensitive drum 309.

Then, the electrostatic latent image is developed with toner stored in a developer 314, and the developed toner image is formed on the outer surface of the photosensitive drum 309. The toner image formed on the photosensitive drum 309 is transferred onto the recording medium by a transfer charger 315 provided at a position (transfer position) facing the photosensitive drum 309. In synchronization with the transfer timing, the registration roller 308 conveys the recording medium to the transfer position.

The recording medium onto which the toner image is transferred as described above is sent to a fixing device 318 by a conveyance belt 317 and then heated and pressed by the fixing device 318 so that the toner image is fixed to the recording medium. In this way, the image forming apparatus 100 forms an image on the recording medium.

In a case where image forming is performed in a single-side printing mode, the recording medium having passed through the fixing device 318 is discharged onto a sheet discharge tray (not illustrated) by sheet discharge rollers 319 and 324. In a case where image forming is performed in a double-side printing mode, the fixing device 318 performs fixing processing on a first surface of the recording medium and thereafter the recording medium is conveyed to an inversion path 325 by the sheet discharge rollers 319, a conveyance roller 320, and an inversion roller 321. Thereafter, the recording medium is conveyed to the registration roller 308 again by conveyance rollers 322 and 323, and an image is formed on a second surface of the recording medium by the above-described method. Thereafter, the recording medium is discharged to a sheet discharge tray (not illustrated) by the sheet discharge rollers 319 and 324.

Further, in a case in which the recording medium having an image formed on the first surface thereof is discharged to the outside of the image forming apparatus 100 with the surface facing downward, the recording medium having passed through the fixing device 318 is conveyed through the sheet discharge roller 319 toward the conveyance roller 320. Then, immediately before the trailing edge of the recording medium passes through a nip portion between the conveyance roller 320 and the opposing roller, the rotation of the conveyance roller 320 is reversed so that the recording medium with the first surface facing downward is discharged through the sheet discharge roller 324 to the outside of the image forming apparatus 100.

The configuration and function of the image forming apparatus 100 have been described above. In the present embodiment, the term "load" refers to a target to be driven by a motor. For example, various rollers (conveyance rollers) such as the sheet feeding rollers 204, 303, and 305, the registration roller 308, and the sheet discharge roller 319 correspond to the loads in the present embodiment. The motor control apparatus in the present embodiment is applicable to a motor configured to drive the loads.

Figure 2:
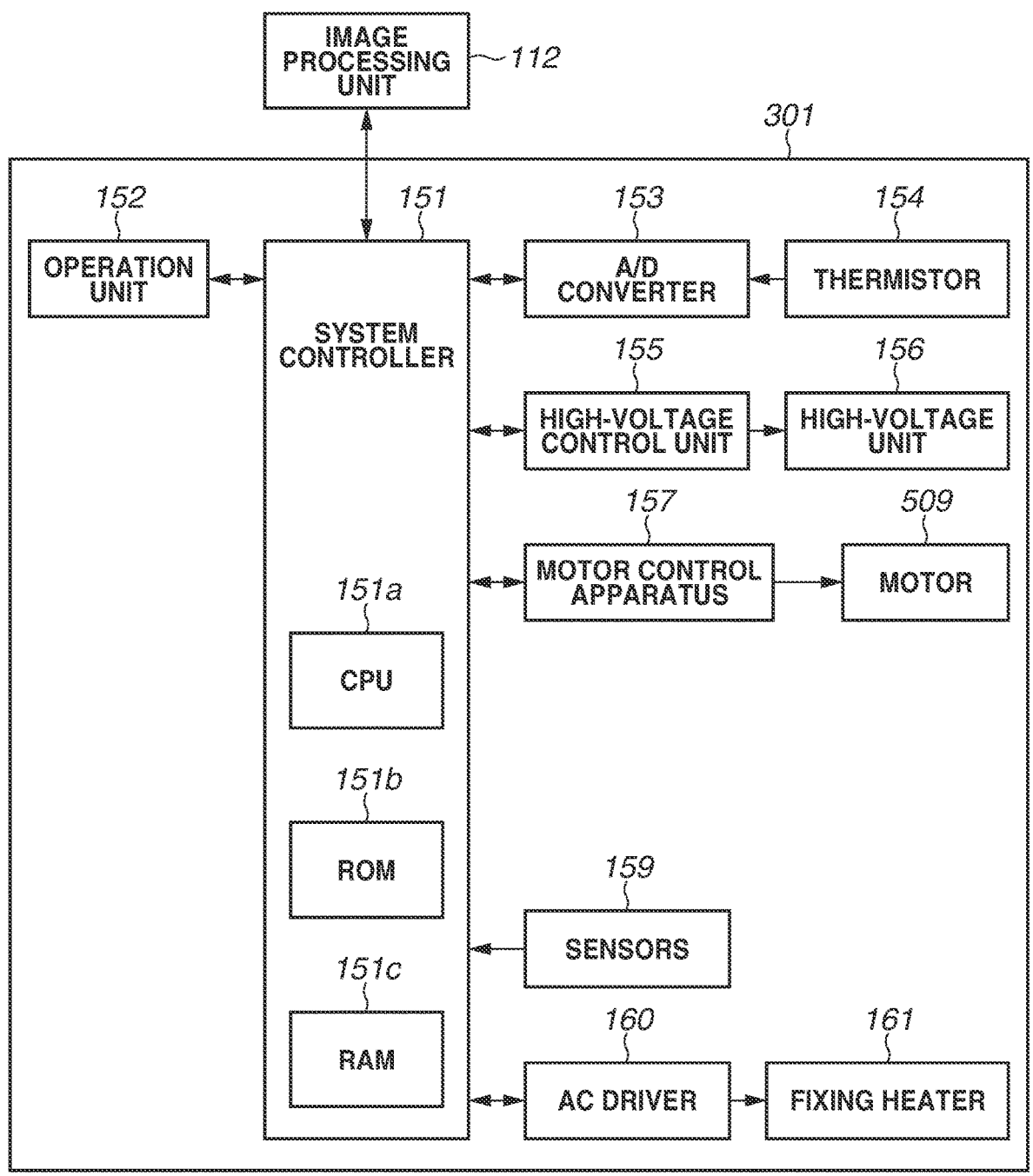
FIG. 2 is a block diagram illustrating a control configuration of the image forming apparatus.

FIG. 2 is a block diagram illustrating an example of a control configuration of the image forming apparatus 100. A system controller 151 includes a central processing unit (CPU) 151 a, a read-only memory (ROM) 151b, and a random access memory (RAM) 151c, as illustrated in FIG. 2. Further, the system controller 151 is connected to the image processing unit 112, an operation unit 152, an analog/digital (A/D) converter 153, a high-voltage control unit 155, a motor control apparatus 157, sensors 159, and an alternating-current (AC) driver 160. The system controller 151 is capable of transmitting and receiving data and commands to and from each connected member.

The CPU 151a reads various programs stored in the ROM 151b and executes the read programs to execute various sequences relating to predetermined image forming sequences.

The RAM 151c is a storage device. The RAM 151c stores various data such as setting values for the high-voltage control unit 155, command values for the motor control apparatus 157, and information received from the operation unit 152.

The system controller 151 transmits, to the image processing unit 112, setting value data on the various apparatuses provided in the image forming apparatus 100 that is necessary for image processing performed by the image processing unit 112. Further, the system controller 151 receives signals from the sensors 159 and sets the setting values of the high-voltage control unit 155 based on the received signals.

The high-voltage control unit 155 supplies a voltage needed by a high-voltage unit 156 (charger 310, developer 314, transfer charger 315, etc.) based on the setting values set by the system controller 151.

The motor control apparatus 157 controls a motor 509 configured to drive the loads according to a command output from the CPU 151 a. While only the motor 509 is illustrated as a motor of the image forming apparatus 100 in FIG. 2, the image forming apparatus 100 includes two or more motors. Alternatively, a single motor control apparatus 157 can control a plurality of motors 509. Further, while only one motor control apparatus 157 is provided in FIG. 2, the image forming apparatus 100 actually includes two or more motor control apparatuses 157.

The A/D converter 153 receives a detection signal detected by a thermistor 154 configured to detect the temperature of a fixing heater 161, converts the detection signal from an analog signal into a digital signal, and transmits the digital signal to the system controller 151. The system controller 151 controls the AC driver 160 based on the digital signal received from the A/D converter 153. The AC driver 160 controls the fixing heater 161 such that the temperature of the fixing heater 161 is adjusted to a temperature required for performing fixing processing. The fixing heater 161 is a heater for use in fixing processing and included in the fixing device 318.

The system controller 151 controls the operation unit 152 to display, on a display unit provided to the operation unit 152, an operation screen for the user to set a setting such as the type (hereinafter, "sheet type") of a recording medium to be used. The system controller 151 receives user-set information from the operation unit 152 and controls the operation sequences of the image forming apparatus 100 based on the user-set information. Further, the system controller 151 transmits information indicating the state of the image forming apparatus 100 to the operation unit 152. Examples of information indicating the state of the image forming apparatus 100 include information about the number of sheets on which an image is to be formed, information about the progress of image forming operation, and information about a sheet jam or double feeding in the document feeding apparatus 201 and the image printing apparatus 301. The operation unit 152 displays the information received from the system controller 151 on the display unit.

The system controller 151 controls the operation sequences of the image forming apparatus 100 as described above.

[Motor Control Apparatus]

Next, the motor control apparatus 157 according to the present embodiment will be described. The motor control apparatus 157 in the present embodiment is capable of controlling a motor using either one of vector control as a first control mode and constant current control as a second control mode. While in the following description, control is described to be performed based on a rotation phase θ, instructed phase θ_ref, and current phase as electrical angles, the control described below can be performed based on, for example, mechanical angles obtained by converting the electrical angles into the mechanical angles.

<Vector Control>

First, a method by which the motor control apparatus 157 in the present embodiment performs vector control will be described with reference to FIGS. 3 and 4. The motor in the following description is not provided with a sensor such as a rotary encoder for detecting the rotation phase of a rotor of the motor.

Figure 3:
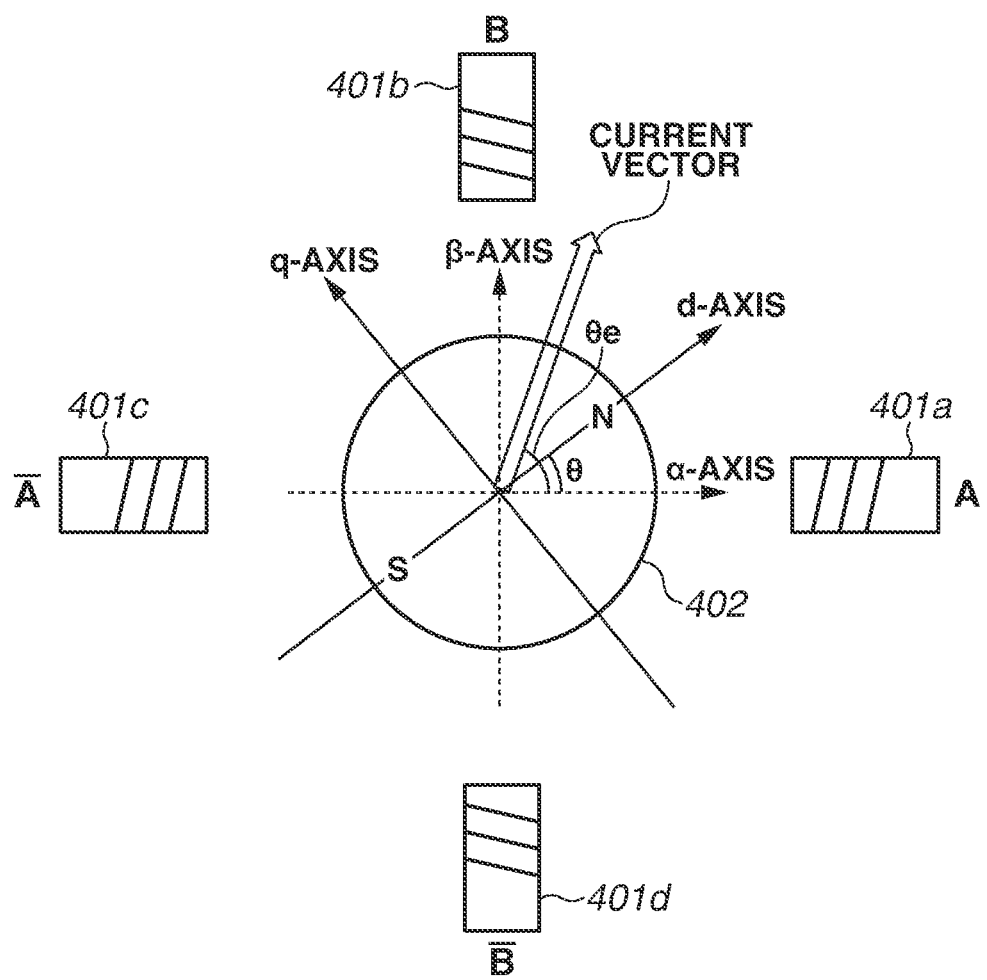
FIG. 3 is a diagram illustrating a relationship between a motor including phases A and B and a rotating coordinate system expressed by d- and q-axes.

FIG. 3 is a diagram illustrating a relationship between the stepping motor (hereinafter, "motor") 509, which includes two phases, phase A (first phase) and phase B (second phase), and a rotating coordinate system expressed by d- and q-axes. In FIG. 3, an α-axis, which is the axis corresponding to the winding wire of the phase A, and a β-axis, which is the axis corresponding to the winding wire of the phase B, are defined in a stationary coordinate system. Further, in FIG. 3, the d-axis is defined along the direction of a magnetic flux generated by the magnetic pole of a permanent magnet used in the rotor 402, and the q-axis is defined along the direction (direction that is orthogonal to the d-axis) that is rotated 90 degrees from the d-axis in the counterclockwise direction. The angle formed by the α- and d-axes is defined as an angle θ, and the rotation phase of the rotor 402 is specified by the angle θ. In the vector control, a rotating coordinate system based on the rotation phase θ of the rotor 402 is used. Specifically, in the vector control, the q-axis component (torque current component) and the d-axis component (excitation current component) are used. The q-axis component generates a torque in the rotor 402 and the d-axis component affects the intensity of a magnetic flux passing through the winding wire, which are both current components of the current vector corresponding to the driving current flowing in the winding wire in the rotating coordinate system.

The vector control is a method for controlling a motor by performing phase feedback control to control the values of the torque current component and the excitation current component such that the deviation between an instructed phase representing a target phase of a rotor and an actual rotation phase is reduced. Further, there is another method for controlling a motor by performing speed feedback control to control the values of the torque current component and the excitation current component such that the deviation between an instructed speed representing a target speed of a rotor and an actual rotation speed is reduced.

Figure 4:
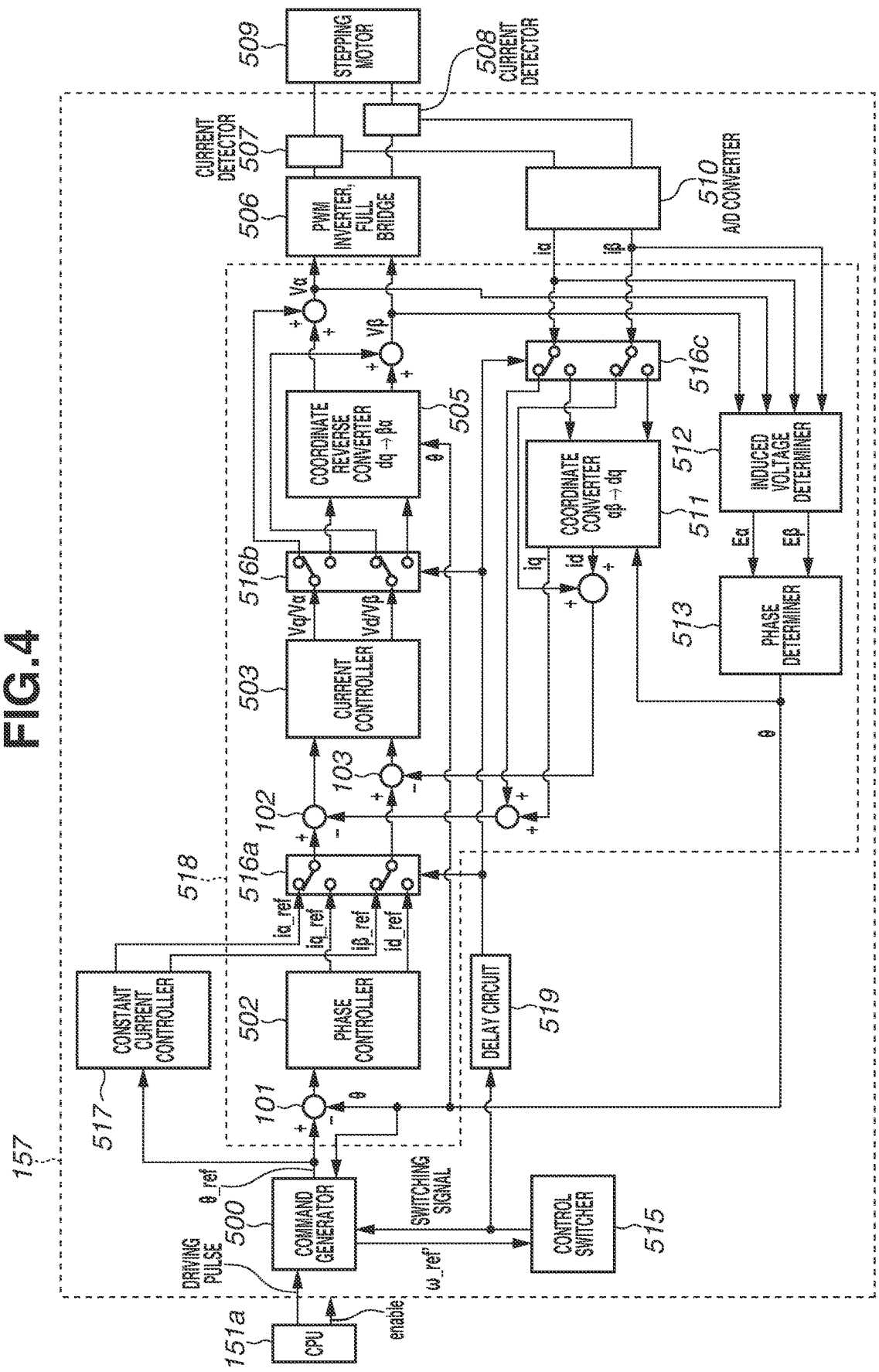
FIG. 4 is a block diagram illustrating a configuration of a motor control apparatus according to a first embodiment.

FIG. 4 is a block diagram illustrating an example of the configuration of the motor control apparatus 157 which controls the motor 509. The motor control apparatus 157 includes at least one ASIC and executes various functions described below.

As illustrated in FIG. 4, the motor control apparatus 157 includes a constant current controller 517 and a vector controller 518. The constant current controller 517 performs the constant current control, and the vector controller 518 performs the vector control.

The motor control apparatus 157 includes, as a circuit for performing the vector control, a phase controller 502, a current controller 503, a coordinate reverse converter 505, a coordinate converter 511, and a pulse width modulation (PWM) inverter 506 configured to supply a driving current to the winding wire of the motor 509. The coordinate converter 511 performs coordinate conversion on the current vector corresponding to the driving current flowing in each of the winding wires of the phases A and B of the motor 509 from the stationary coordinate system represented by the α- and β-axes into the rotating coordinate system represented by the q- and d-axes. Consequently, the driving current flowing in the winding wire is expressed by the current value (q-axis current) of the q-axis component and the current value (d-axis current) of the d-axis component, which are the current values in the rotating coordinate system. The q-axis current corresponds to a torque current which generates a torque in the rotor 402 of the motor 509. Further, the d-axis current corresponds to an excitation current that affects the intensity of the magnetic flux through the winding wire of the motor 509. The motor control apparatus 157 is capable of controlling the q-axis current and the d-axis current separately. Thus, the motor control apparatus 157 is capable of efficiently generating a necessary torque for the rotor 402 to rotate by controlling the q-axis current according to the load torque applied to the rotor 402. In other words, the magnitude of the current vector specified in FIG. 3 changes according to the load torque applied to the rotor 402 in the vector control.

The motor control apparatus 157 determines the rotation phase θ of the rotor 402 of the motor 509 by the below-described method and performs the vector control based on the determination result. The CPU 151a outputs a driving pulse as a command for driving the motor 509 to a command generator 500 based on an operation sequence of the motor 509. The operation sequence (motor driving pattern) of the motor 509 is stored in, for example, the ROM 151b, and the CPU 151a outputs a driving pulse as a pulse train based on the operation sequence stored in the ROM 151b.

The command generator 500 generates the instructed phase θ_ref, which represents the target phase of the rotor 402, based on the driving pulse output from the CPU 151a and outputs the instructed phase θ_ref. The configuration of the command generator 500 will be described below.

A subtractor 101 calculates the deviation between the rotation phase θ of the rotor 402 of the motor 509 and the instructed phase θ_ref and outputs the calculated deviation.

The phase controller 502 acquires a deviation Δθ with a period T (e.g., 200 μs). The phase controller 502 generates a q-axis current instructed value iq_ref and a d-axis current instructed value id_ref based on proportional control (P-control), integral control (I-control), and differential control (D-control) in such a way as to reduce the deviation output from the subtractor 101, and outputs the q-axis current instructed value iq_ref and the d-axis current instructed value id_ref. In other words, the phase controller 502 generates the q-axis current instructed value iq_ref and the d-axis current instructed value id_ref based on the P-control, I-control, and D-control in such a way as to reduce the deviation output from the subtractor 101 to zero, and outputs the q-axis current instructed value iq_ref and the d-axis current instructed value id_ref. The P-control is a method of controlling a control target value based on a value that is proportional to the deviation between an instructed value and an estimated value. Further, the I-control is a method of controlling a control target value based on a value that is proportional to the time integral value of the deviation between an instructed value and an estimated value. Further, the D-control is a method of controlling a control target value based on a value that is proportional to the temporal change of the deviation between an instructed value and an estimated value. While the phase controller 502 in the present embodiment generates the q-axis current instructed value iq_ref and the d-axis current instructed value id_ref based on the proportional-integral-derivative control (PID-control), the configuration is not limited to that described above. For example, the phase controller 502 can generate the q-axis current instructed value iq_ref and the d-axis current instructed value id_ref based on the PI-control. In the case of using a permanent magnet in the rotor 402, the d-axis current instructed value id_ref which affects the intensity of the magnetic flux through the winding wire is normally set to zero, but the d-axis current instructed value id_ref is not limited to zero.

The driving current that flows in the winding wire of the phase A of the motor 509 is detected by a current detector 507 and thereafter converted by an A/D converter 510 from an analog value to a digital value. Further, the driving current that flows in the winding wire of the phase B of the motor 509 is detected by a current detector 508 and thereafter converted by the A/D converter 510 from an analog value to a digital value. The period (predetermined period) of current detection by the current detectors 507 and 508 is, for example, a period (e.g., 25 μs) not longer than the period T in which the phase controller 502 acquires the deviation Δθ.

The current values of the driving currents converted from the analog value to the digital value by the A/D converter 510 are expressed as current values iα and iβ in the stationary coordinate system by the formulas below using a phase θe of the current vector illustrated in FIG. 3. The phase θe of the current vector is defined as the angle formed by the α-axis and the current vector. Further, I denotes the magnitude of the current vector.

$$i\alpha = I^* \cos \theta e \quad (1)$$

$$i\beta = I^* \sin \theta e \quad (2)$$

The current values iα and iβ are input to the coordinate converter 511 and an induced voltage determiner 512.

The coordinate converter 511 converts the current values iα and iβ in the stationary coordinate system into a current value iq of the q-axis current and a current value id of the d-axis current in the rotating coordinate system using the following formulas:

$$id = \cos \theta^* i\alpha + \sin \theta^* i\beta \quad (3); \text{ and}$$

$$iq = -\sin \theta^* i\alpha + \cos \theta^* i\beta \quad (4).$$

The q-axis current instructed value iq_ref output from the phase controller 502 and the current value iq output from the coordinate converter 511 are input to a subtractor 102. The subtractor 102 calculates the deviation between the q-axis current instructed value iq_ref and the current value iq and outputs the calculated deviation to the current controller 503.

Further, the d-axis current instructed value id_ref output from the phase controller 502 and the current value id output from the coordinate converter 511 are input to a subtractor 103. The subtractor 103 calculates the deviation between the d-axis current instructed value id_ref and the current value id and outputs the calculated deviation to the current controller 503.

The current controller 503 generates a driving voltage Vq based on the PID-control in such a way as to reduce the deviation output from the subtractor 102. Specifically, the current controller 503 generates the driving voltage Vq in such a way as to reduce the deviation output from the subtractor 102 to zero and outputs the generated driving voltage Vq to the coordinate reverse converter 505.

Further, the current controller 503 generates a driving voltage Vd based on the PID-control in such a way as to reduce the deviation output from the subtractor 103. Specifically, the current controller 503 generates the driving voltage Vd in such a way as to reduce the deviation output from the subtractor 103 to zero and outputs the driving voltage Vd to the coordinate reverse converter 505.

While the current controller 503 generates the driving voltages Vq and Vd based on the PID-control in the present embodiment, the configuration is not limited to that described above. For example, the current controller 503 can generate the driving voltages Vq and Vd based on the PI-control.

The coordinate reverse converter 505 reverse-converts the driving voltages Vq and Vd in the rotating coordinate system output from the current controller 503 into driving voltages Vα and Vβ in the stationary coordinate system using the following formulas:

$$V\alpha = \cos \theta^* Vd - \sin \theta^* Vq \quad (5); \text{ and}$$

$$V\beta = \sin \theta^* Vd + \cos \theta^* Vq \quad (6).$$

The coordinate reverse converter 505 outputs the reverse-converted driving voltages Vα and Vβ to the induced voltage determiner 512 and the PWM inverter 506.

The PWM inverter 506 includes a full bridge circuit. The full bridge circuit is driven by PWM signals based on the driving voltages Vα and Vβ input from the coordinate reverse converter 505. Consequently, the PWM inverter 506 generates the driving currents iα and iβ corresponding to the driving voltages Vα and Vβ and supplies the driving currents iα and iβ to the winding wires of the respective phases of the motor 509 to thereby drive the motor 509. In other words, the PWM inverter 506 functions as a supply unit that supplies currents to the winding wires of the respective phases of the motor 509. While the PWM inverter 506 includes the full bridge circuit in the present embodiment, the PWM inverter 506 can be a half bridge circuit.

Next, a configuration for determining the rotation phase θ will be described. In the determination of the rotation phase θ of the rotor 402, the values of induced voltages Eα and Eβ induced in the winding wires of the phases A and B of the motor 509 by the rotation of the rotor 402 are used. The values of the induced voltages Eα and Eβ are determined (calculated) by the induced voltage determiner 512. Specifically, the induced voltages Eα and Eβ are determined from the current values iα and iβ input from the A/D converter 510 to the induced voltage determiner 512 and the driving voltages Vα and Vβ input from the coordinate reverse converter 505 to the induced voltage determiner 512, using the following formulas:

$$E\alpha = V\alpha - R^* i\alpha - L^* di\alpha/dt \quad (7); \text{ and}$$

$$E\beta = V\beta - R^* i\beta - L^* di\beta/dt \quad (8).$$

In the formulas, R is a winding wire resistance, and L is a winding wire inductance. The values of the winding wire resistance R and the winding wire inductance L are values unique to the motor 509 in use and are stored in advance in a memory (not illustrated) provided in the ROM 151b or the motor control apparatus 157.

The induced voltages Eα and Eβ determined by the induced voltage determiner 512 are output to a phase determiner 513.

The phase determiner 513 determines the rotation phase θ of the rotor 402 of the motor 509 based on the ratio between the induced voltages Eα and Eβ output from the induced voltage determiner 512 using the following formula:

$$\theta = \tan^{-1}(-E\beta/E\alpha) \quad (9).$$

While the phase determiner 513 determines the rotation phase θ by performing calculation based on formula (9) in the present embodiment, the configuration is not limited to that described above. For example, the phase determiner 513 can determine the rotation phase θ by referring to a table that is stored in the ROM 151b and specifies the relationship between the induced voltages Eα and Eβ and the rotation phase θ corresponding to the induced voltages Eα and Eβ.

The rotation phase θ of the rotor 402 which is acquired as described above is input to the subtractor 101, the command generator 500, the coordinate reverse converter 505, and the coordinate converter 511.

The motor control apparatus 157 repeatedly performs the above-described control in the case of performing the vector control.

As described above, the motor control apparatus 157 in the present embodiment performs the vector control using phase feedback control to control the current values in the rotating coordinate system in such a way as to reduce the deviation between the instructed phase θ_ref and the rotation phase θ. The execution of the vector control prevents the motor 509 from being brought into the out-of-synchronism state and prevents an increase in motor sound and an increase in power consumption resulting from a surplus torque. Further, the phase feedback control is performed so that the rotation phase of the rotor is controlled to a desired phase. Accordingly, the vector control using phase feedback control is applied to the motor 509 for driving the load (registration roller, etc.) that requires accurate control of the rotation phase of the rotor 402 in the image forming apparatus 100 so that an image is formed on a recording medium as appropriate.

<Constant Current Control>

Next, the constant current control according to the present embodiment will be described.

The constant current control controls, when a predetermined current is supplied to the winding wire of the motor 509, the driving current flowing in the winding wire. Specifically, in the constant current control, a driving current having an amplitude corresponding to a torque obtained by adding a predetermined margin to a torque considered necessary for the rotor 402 to rotate is supplied to the winding wire such that the motor 509 does not lose synchronism even if the load torque applied to the rotor 402 is changed. The reason is as follows. In the constant current control, a configuration for controlling the magnitude of the driving current based on the determined (estimated) rotation phase and rotation speed is not used (i.e., feedback control is not performed), so that the driving current is not adjustable according to the load torque applied to the rotor 402. The greater the magnitude of the current is, the greater the torque applied to the rotor 402 becomes. Further, the amplitude corresponds to the amplitude of the current vector.

While the current of the predetermined magnitude is supplied to the winding wire of the motor 509 to control the motor 509 during the constant current control in the following description, the control is not limited to that described below. For example, in the constant current control, the motor 509 can be controlled by supplying the predetermined magnitude of a current for the period during which the motor speed is increased or the predetermined magnitude of a current for the period during which the motor speed is decreased.

In FIG. 4, the command generator 500 outputs the instructed phase θ_ref to the constant current controller 517 based on the driving pulse output from the CPU 151a. The constant current controller 517 generates the instructed values iα_ref and iβ_ref of the current in the stationary coordinate system which correspond to the instructed phase θ_ref output from the command generator 500, and outputs the generated instructed values iα_ref and iβ_ref. In the present embodiment, the magnitude of the current vector corresponding to each of the instructed values iα_ref and iβ_ref of the current in the stationary coordinate system is always constant.

The driving currents that flow in the winding wires of the phases A and B of the motor 509 are detected by the current detectors 507 and 508. The detected driving currents are each converted from an analog value into a digital value by the A/D converter 510 as described above.

The current value iα output from the A/D converter 510 and the current instructed value iα_ref output from the constant current controller 517 are input to the subtractor 102. The subtractor 102 calculates the deviation between the current instructed value iα_ref and the current value iα and outputs the calculated deviation to the current controller 503.

Further, the current value iβ output from the A/D converter 510 and the current instructed value iβ_ref output from the constant current controller 517 are input to the subtractor 103. The subtractor 103 calculates the deviation between the current instructed value iβ_ref and the current value iβ and outputs the calculated deviation to the current controller 503.

The current controller 503 outputs the driving voltages Vα and Vβ based on the PID-control in such a way as to reduce the deviation to be input. Specifically, the current controller 503 outputs the driving voltages Vα and Vβ such that the deviation to be input is adjusted to a value close to zero.

The PWM inverter 506 supplies the driving currents to the winding wires of the respective phases of the motor 509 based on the input driving voltages Vα and Vβ to drive the motor 509 using the above-described method.

As described above, neither the phase feedback control nor the speed feedback control is performed in the constant current control in the present embodiment. Specifically, the driving current to be supplied to the winding wire is not adjusted according to the rotation status of the rotor 402 in the constant current control in the present embodiment. Thus, in the constant current control, a current obtained by adding a predetermined margin to a current necessary for the rotor 402 to rotate is supplied to the winding wire to prevent the motor 509 from being brought into the out-of-synchronism state. Specifically, the instructed values iα_ref and iβ_ref of the current in the stationary coordinate system each include the current value necessary for the rotor 402 to rotate and the current value corresponding to the predetermined margin.

<Command Generator>

Figure 5:
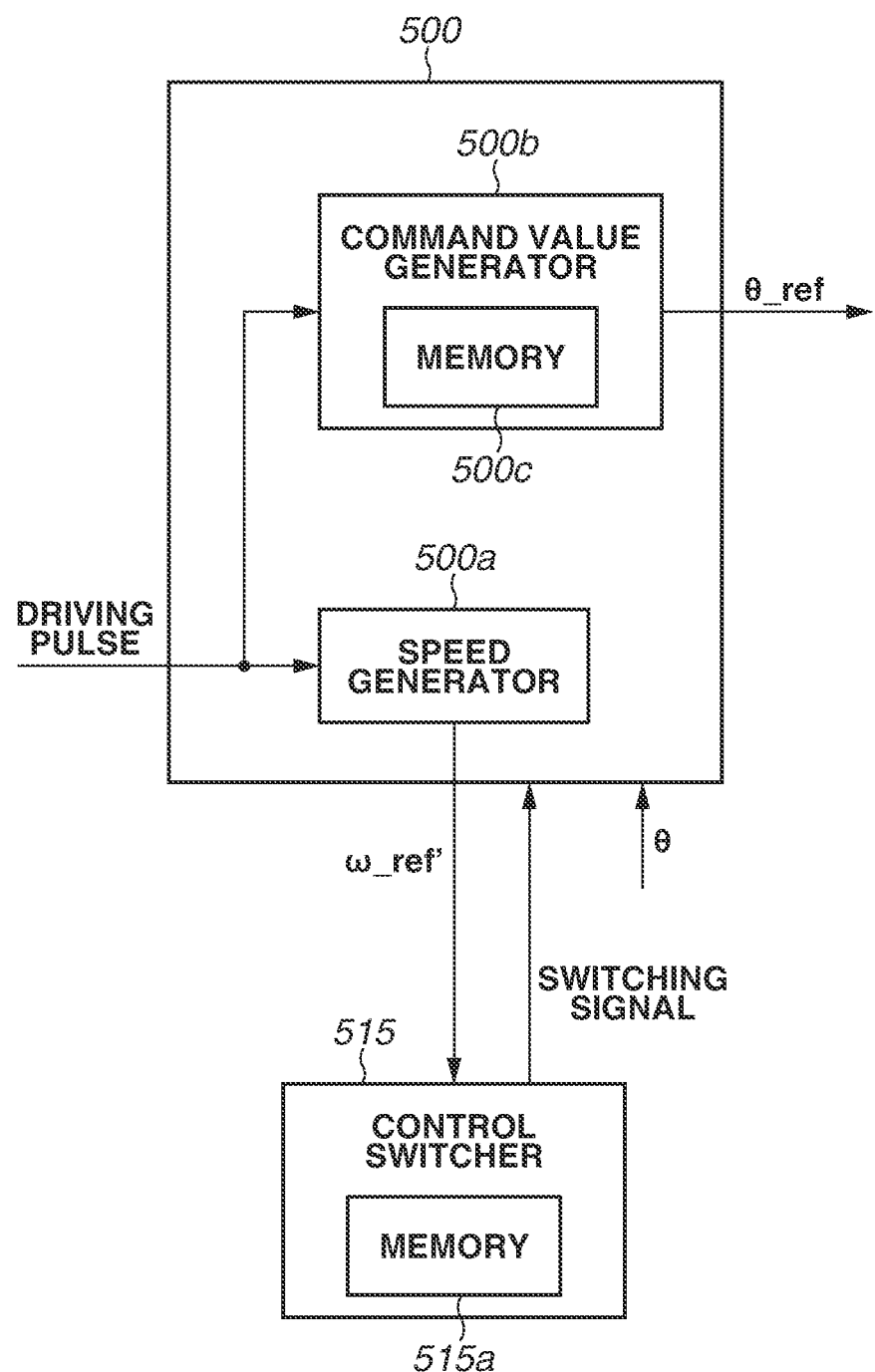
FIG. 5 is a block diagram illustrating a configuration of a command generator.

FIG. 5 is a block diagram illustrating the configuration of the command generator 500 in the present embodiment. As illustrated in FIG. 5, the command generator 500 includes a speed generator 500a and a command value generator 500b. The speed generator 500a is a speed determination unit configured to generate the rotation speed ω_ref as a substitute for the instructed speed. The command value generator 500b generates the instructed phase θ_ref based on the driving pulse output from the CPU 151 a.

The speed generator 500a generates the rotation speed ω_ref based on the time interval between the edges of falls of the continuous driving pulse, and outputs the rotation speed ω_ref. Specifically, the rotation speed ω_ref changes with the period corresponding to the period of the driving pulse.

The command value generator 500b generates the instructed phase θ_ref based on the driving pulse output from the CPU 151 a using formula (10) below, and outputs the generated instructed phase θ_ref.

$$\theta\_ref = \theta ini + \theta\ step * n \quad (10)$$

In formula (10), θini is the phase (initial phase) of the rotor 402 at the start of the driving of the motor 509. Further, θ step is the amount of increase (amount of change) in θ_ref per driving pulse. Further, n is the number of pulses input to the command value generator 500b.

{Micro-Step Driving Method}

In the present embodiment, a micro-step driving method is used in the constant current control. The driving method used in the constant current control is not limited to the micro-step driving method and can be, for example, a full-step driving method.

Figure 6:
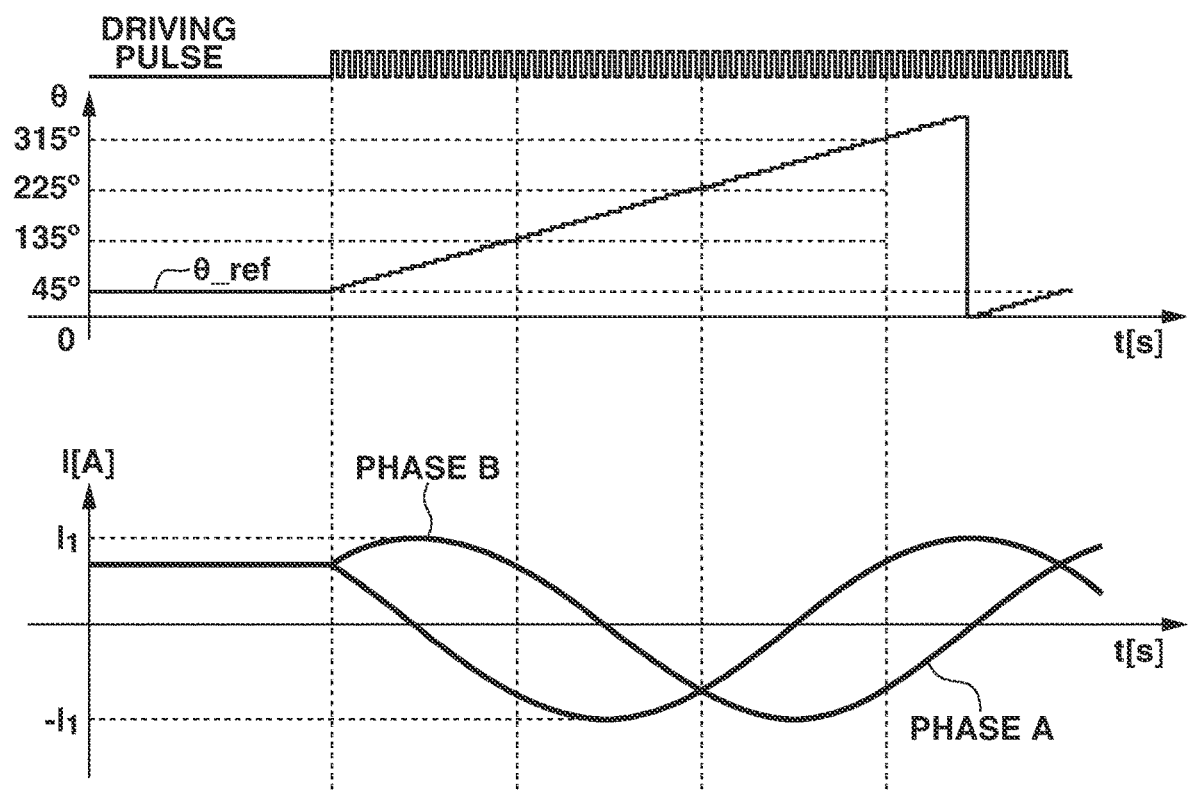
FIG. 6 a diagram illustrating an example of a method for performing a micro-step driving method.

FIG. 6 is a diagram illustrating an example of the micro-step driving method. In FIG. 6, the driving pulse output from the CPU 151a, the instructed phase θ_ref generated by the command value generator 500b, and the currents that respectively flow in the winding wires of the phases A and B are specified.

A method of performing micro-step driving according to the present embodiment will be described with reference to FIGS. 5 and 6. The driving pulse and the instructed phase in FIG. 6 indicate the state in which the rotor 402 is rotated at constant speed.

The advance amount (90°/N) of the instructed phase θ_ref in the micro-step driving method is an amount obtained by dividing 90°, which is the advance amount of the instructed phase θ_ref in the full-step driving method, into 1/N (N is a positive integer). Thus, the waveforms of the currents change smoothly in the shape of a sine wave as illustrated in FIG. 6 and, thus, the rotation phase θ of the rotor 402 is controllable more precisely.

In the case where micro-step driving is performed, the command value generator 500b generates the instructed phase θ_ref based on the driving pulse output from the CPU 151a using formula (11) below, and outputs the instructed phase θ_ref.

$$\theta\_ref = 45° + 90/No * n \quad (11)$$

As described above, if one driving pulse is input, the command value generator 500b adds 90/No. to the instructed phase θ_ref to thereby update the instructed phase θ_ref. Specifically, the number driving pulses output from the CPU 151 a corresponds to the instructed phase. The period (frequency) of the driving pulse output from the CPU 151a corresponds to the target speed (instructed speed) of the motor 509.

<Switch Between Vector Control and Constant Current Control>

Next, a method of switching between the vector control and the constant current control will be described. As illustrated in FIG. 4, the motor control apparatus 157 according to the present embodiment includes a configuration for switching between the constant current control and the vector control. Specifically, the motor control apparatus 157 includes a control switcher 515, selector switches 516a and 516b, and a delay circuit 519. During the period in which the constant current control is performed, the circuit that performs the vector control is in operation. Further, the circuit that performs the constant current control can be either in operation or stopped during the period in which the vector control is performed.

As illustrated in FIG. 5, the rotation speed ω_ref output from the speed generator 500a is input to the control switcher 515. The control switcher 515 compares the rotation speed ω_ref with the threshold value ωth as a predetermined value and outputs a switching signal for switching between the constant current control and the vector control based on the comparison result.

Figure 7:
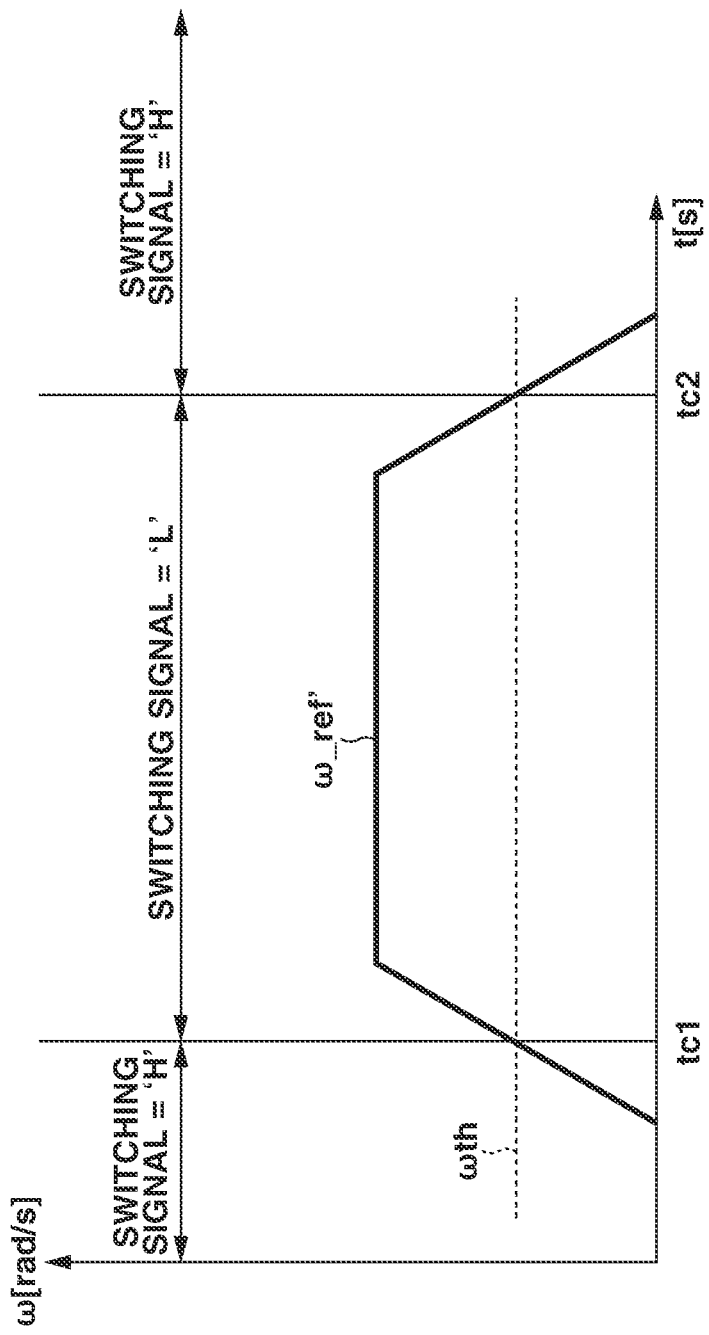
FIG. 7 a diagram illustrating a relationship between a rotation speed $\omega\_ref$ and a threshold value $\omega th$ and a switching signal.

FIG. 7 is a diagram illustrating the relationship between the rotation speed ω_ref and the threshold value ωth and the switching signal. In FIG. 7, a time point tc1 indicates the timing at which the rotation speed ω_ref changes from a value smaller than the threshold value ωth to a value larger than the threshold value ωth. Meanwhile, a time point tc2 in FIG. 7 indicates the timing at which the rotation speed ω_ref changes from a value larger than the threshold value ωth to a value smaller than the threshold value ωth. While the threshold value ωth in present embodiment is set to the lowest rotation speed among the rotation speeds from which the rotation phase θ is determinable with good accuracy, the threshold value ωth is not limited to that described above. For example, the threshold value ωth can be set to a value larger than or equal to the lowest rotation speed among the rotation speeds from which the rotation phase θ is determinable with good accuracy. Further, the threshold value ωth is, for example, stored in advance in a memory 515a provided in the control switcher 515.

As illustrated in FIG. 7, the control switcher 515 sets the switching signal to "H" in the case where the constant current control is performed, whereas the control switcher 515 sets the switching signal to "L" in the case where the vector control is performed. The switching signal output from the control switcher 515 is input to the command generator 500 and the delay circuit 519 as illustrated in FIG. 4. The control switcher 515 outputs the switching signal with, for example, the same period as the period at which the rotation speed ω_ref is input.

The delay circuit 519 outputs the input switching signal after a predetermined delay time from the time of output of the switching signal from the control switcher 515. The predetermined delay time is longer than the time between the output of the switching signal from the control switcher 515 and the output of the instructed phase θ_ref from the command generator 500 in response to the switching signal. A configuration in which the phase controller 502 outputs the instructed phase θ_ref in response to the switching signal will be described below.

If the rotation speed ω_ref reaches the threshold value ωth or more (ω_ref≥ωth) while the constant current controller 517 performs control, the control switcher 515 switches the controller for controlling the motor 509. Specifically, the control switcher 515 switches the switching signal from "H" to "L" and outputs the switched switching signal in such a way as to switch the controller for controlling the motor 509 from the constant current controller 517 to the vector controller 518. After the predetermined delay time from the time of the output of the switching signal from the control switcher 515, the delay circuit 519 outputs the input switching signal to the selector switches 516a and 516b. Consequently, the state of each of the selector switches 516a, 516b, and 516c is changed according to the switching signal, and the vector controller 518 performs the vector control.

Further, in the case in which the rotation speed ω_ref is less than the threshold value ωth (ω_ref<ωth) while the constant current controller 517 performs control, the control switcher 515 does not switch the controller for controlling the motor 509. Specifically, the control switcher 515 outputs the switching signal "H" in such a way as to maintain the state in which the motor 509 is controlled by the constant current controller 517. After the predetermined delay time from the time of the output of the switching signal from the control switcher 515, the delay circuit 519 outputs the input switching signal to the selector switches 516a and 516b. Consequently, the state of each of the selector switches 516a, 516b, and 516c is maintained, and the constant current controller 517 continues the constant current control.

If the rotation speed ω_ref becomes less than the threshold value ωth (ω_ref<ωth) while the vector controller 518 performs control, the control switcher 515 changes the controller for controlling the motor 509. Specifically, the control switcher 515 switches the switching signal from "L" to "H" and outputs the switched switching signal in such a way as to switch the controller for controlling the motor 509 from the vector controller 518 to the constant current controller 517. After the predetermined delay time from the time of the output of the switching signal from the control switcher 515, the delay circuit 519 outputs the input switching signal to the selector switches 516a and 516b. Consequently, the state of each of the selector switches 516a, 516b, and 516c is changed, and the constant current controller 517 performs the constant current control.

Further, in the case in which the rotation speed ω_ref reaches the threshold value ωth or higher (ω_ref≥ωth) while the vector controller 518 performs control, the control switcher 515 does not switch the controller for controlling the motor 509. Specifically, the control switcher 515 outputs the switching signal "L" in such a way as to maintain the state in which the motor 509 is controlled by the vector controller 518. After the predetermined delay time from the time of the output of the switching signal from the control switcher 515, the delay circuit 519 outputs the input switching signal to the selector switches 516a and 516b. Consequently, the state of each of the selector switches 516a, 516b, and 516c is maintained, and the vector controller 518 continues the vector control.

<Processing at the Time of Switching Control>

Next, processing performed by the motor control apparatus 157 at the time of switching the motor control method will be described. In the present embodiment, the following configuration is applied to thereby prevent motor control from becoming unstable when the control mode for controlling the motor 509 is switched.

Figure 8:
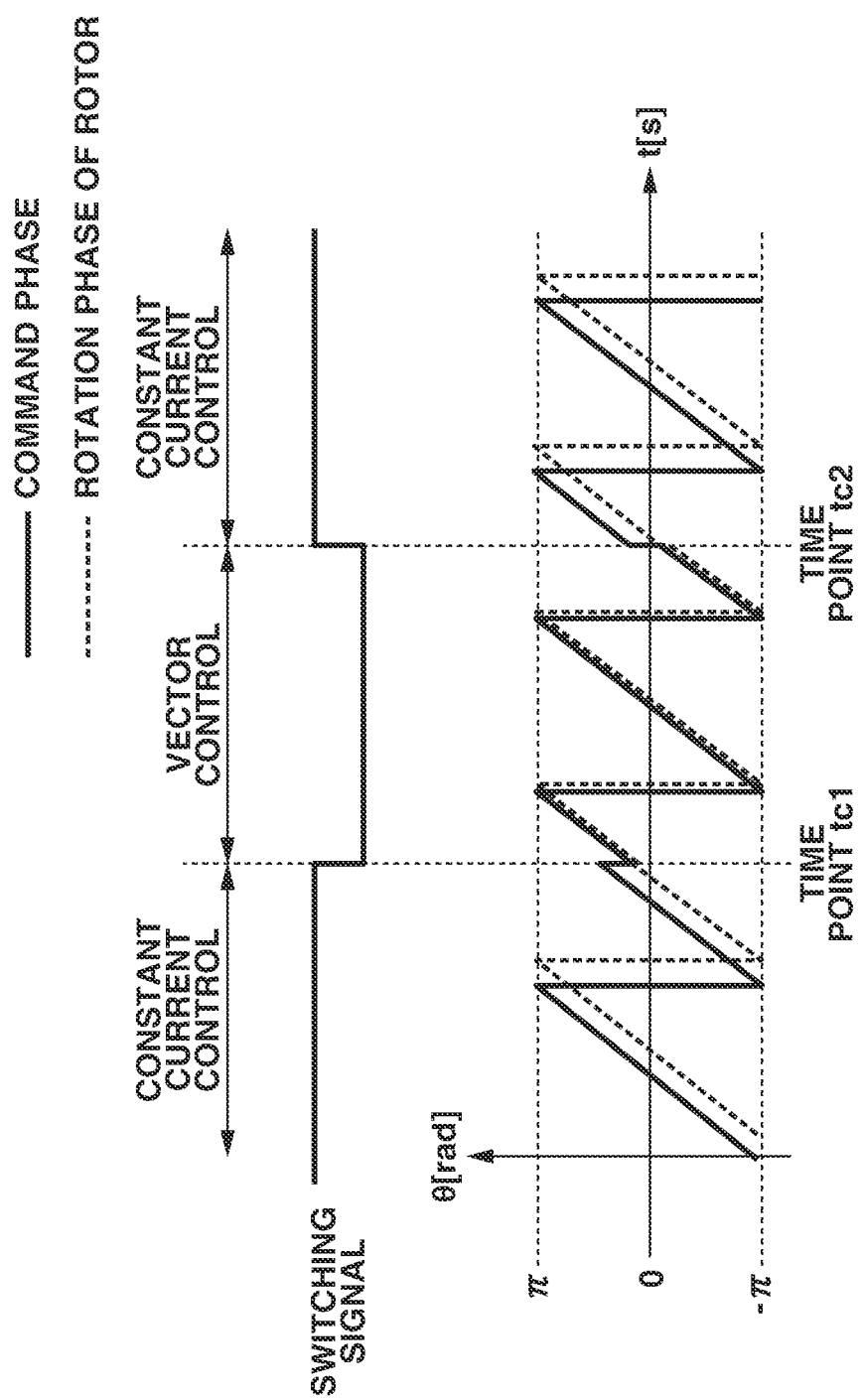
FIG. 8 a diagram illustrating a processing method in switching motor control in the first embodiment.

FIG. 8 is a diagram illustrating a processing method at the time of switching motor control in the present embodiment.

In FIG. 8, the solid line represents the instructed phase θ_ref of the motor 509, and the broken line represents the rotation phase θ of the rotor 402.

As illustrated in FIG. 8, in the constant current control, the rotor 402 is rotated in the state in which the phase difference between the instructed phase and the rotation phase of the rotor 402 is a phase difference corresponding to the load torque applied to the rotor 402. Meanwhile, in the vector control, since the motor 509 is controlled in such a way as to reduce the deviation between the instructed phase and the rotation phase of the rotor 402, the rotor 402 is rotated in the state in which the phase difference between the instructed phase and the rotation phase of the rotor 402 is smaller than the phase difference in the constant current control. Specifically, in the vector control, since the motor 509 is controlled in such a way as to reduce the deviation between the instructed phase and the rotation phase of the rotor 402, the rotor 402 is rotated in the state in which the phase difference between the instructed phase and the rotation phase of the rotor 402 is substantially zero.

In the present embodiment, the rotation phase θ determined by the phase determiner 513 is output to the command generator 500, as illustrated in FIG. 4. In the present embodiment, the command generator 500 adjusts the instructed phase θ_ref to be output at the time of switching the motor control method from the constant current control to the vector control. Specifically, if the switching signal input from the control switcher 515 is switched from "H" to "L", the command generator 500 (command value generator 500b) outputs, as the instructed phase θ_ref, the rotation phase θ that is last input before the switching signal is switched from "H" to "L". Thereafter, the command value generator 500b generates the instructed phase θ_ref based on the driving pulse input from the CPU 151a using the rotation phase θ as an initial value, and outputs the generated instructed phase θ_ref. The command value generator 500b stores the output instructed phase θ_ref in a memory 500c, and each time the command value generator 500b outputs the instructed phase θ_ref, the command value generator 500b updates the instructed phase θ_ref stored in the memory 500c with the newly output instructed phase θ_ref.

The command value generator 500b stores, in the memory 500c, a phase difference δ between the rotation phase θ that is last input before the switching signal is switched from "H" to "L" and the instructed phase θ_ref that is last output before the switching signal is switched from "H" to "L" (the instructed phase θ_ref stored in the memory 500c). The phase difference δ (load angle) is the value corresponding to the load torque applied to the rotor 402 of the motor 509, and the larger the load torque is, the larger the phase difference δ becomes.

Further, in the present embodiment, the command generator 500 adjusts the instructed phase θ_ref when the motor control method is switched from the vector control to the constant current control. Specifically, the command value generator 500b outputs, as the instructed phase θ_ref, a phase obtained by adding the phase difference δ stored in the memory 500c to the instructed phase θ_ref that is last output before the switching signal is switched from "L" to "H" (the instructed phase θ_ref stored in the memory 500c). The phase difference δ is the phase difference that is stored in the memory 500c at the time of switching the motor control method from the constant current control to the vector control. Thereafter, the command value generator 500b generates the instructed phase θ_ref based on the driving pulse input from the CPU 151 a using the instructed phase θ_ref as an initial value, and outputs the generated instructed phase θ_ref.

The predetermined delay time by which the switching signal is delayed by the delay circuit 519 from the time of the output of the switching signal from the control switcher 515 is longer than the length of time during which the command value generator 500b performs the above-described processing, and shorter than the period with which the switching signal is output from the control switcher 515.

Figure 9:
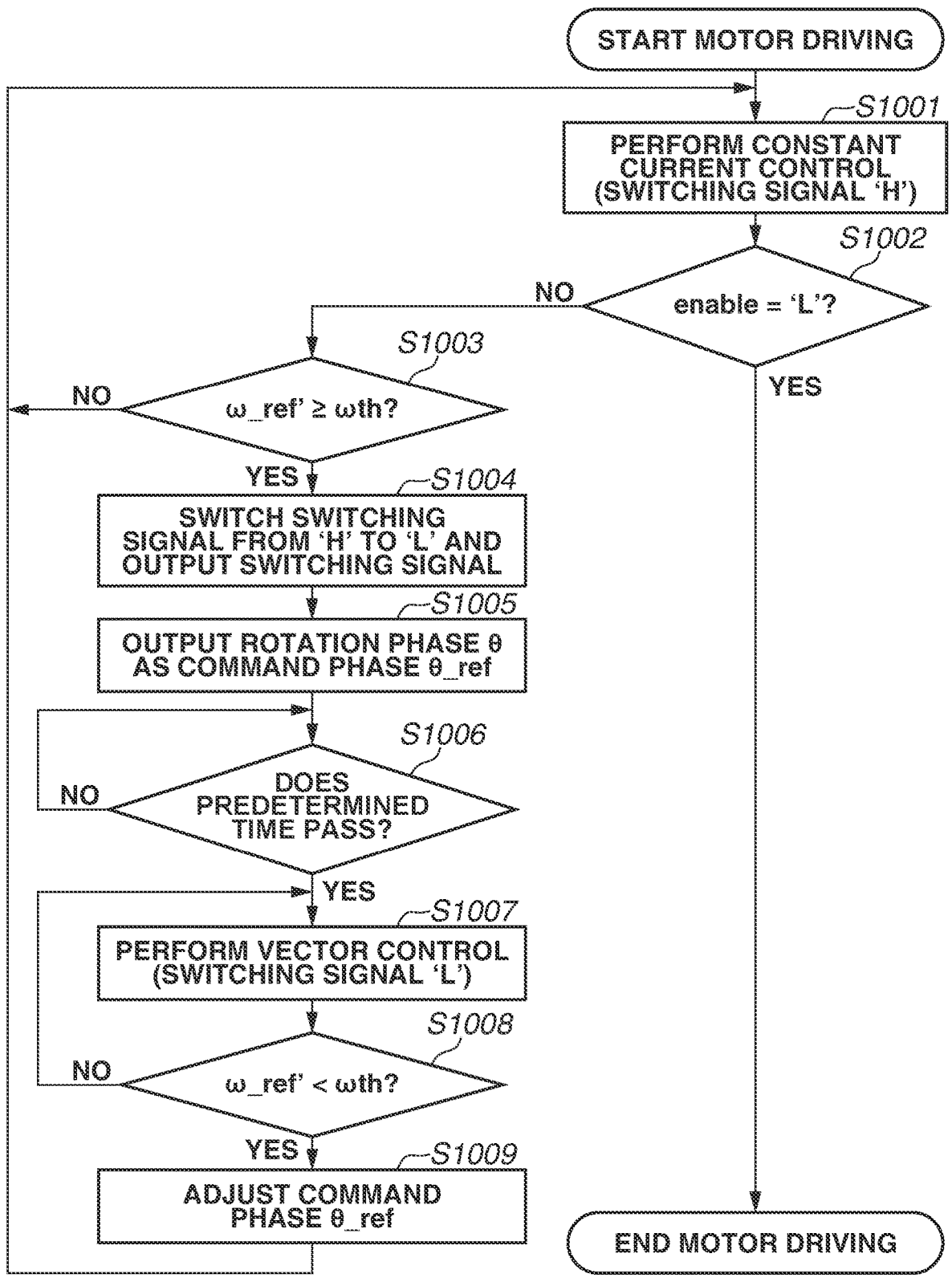
FIG. 9 is a flowchart illustrating a method for controlling a motor by the motor control apparatus according to the first embodiment.

FIG. 9 is a flowchart illustrating a method for controlling the motor 509 by the motor control apparatus 157. The following describes control of the motor 509 in the present embodiment with reference to FIG. 9. The process illustrated in the flowchart is executed by the motor control apparatus 157 having received an instruction from the CPU 151a. While the process illustrated in the flowchart is executed, the command generator 500 acquires the rotation phase θ with the period corresponding to the period during which the phase determiner 513 outputs the rotation phase θ.

First, if an enable signal "H" is output from the CPU 151 a to the motor control apparatus 157, the motor control apparatus 157 starts driving the motor 509 based on a command output from the CPU 151 a. The enable signal is a signal that enables or disables the motor control apparatus 157 to operate. In the case in which the enable signal indicates "L (low level)", the CPU 151a disables the motor control apparatus 157 to operate. In other words, control of the motor 509 by the motor control apparatus 157 is ended. Further, in the case in which the enable signal indicates "H (high level)", the CPU 151a enables the motor control apparatus 157 to operate, and the motor control apparatus 157 controls the motor 509 based on the command output from the CPU 151 a.

Next, in step S1001, the control switcher 515 outputs the switching signal "H" such that the driving of the motor 509 is controlled by the constant current controller 517. Consequently, the constant current controller 517 performs the constant current control.

Then, in step S1002, if the CPU 151a outputs the enable signal "L" to the motor control apparatus 157 (YES in step S1002), the motor control apparatus 157 ends the driving of the motor 509.

On the other hand, in step S1002, if the CPU 151a outputs the enable signal "H" to the motor control apparatus 157 (NO in step S1002), the processing proceeds to step S1003.

Next, in step S1003, if the rotation speed ω_ref is less than the threshold value ωth (NO in step S1003), the processing returns to step S1001. In other words, the constant current controller 517 continues the constant current control.

On the other hand, in step S1003, if the rotation speed ω_ref is greater than or equal to the threshold value ωth (YES in step S1003), then in step S1004, the control switcher 515 switches the switching signal from "H" to "L" and then outputs the switching signal.

Thereafter, in step S1005, the command value generator 500b outputs, as the instructed phase θ_ref, the rotation phase θ that is last input before the switching signal is switched from "H" to "L".

Then, in step S1006, if the predetermined delay time passes (YES in step S1006), then in step S1007, the delay circuit 519 outputs the switching signal "L" to the selector switches 516a, 516b, and 516c. Consequently, the vector controller 518 performs the vector control.

In step S1008, if the rotation speed ω_ref is greater than or equal to the threshold value ωth (NO in step S1008), the processing returns to step S1007, and the vector controller 518 continues the vector control.

On the other hand, in step S1008, if the rotation speed ω_ref is less than the threshold value ωth (YES in step S1008), then in step S1009, a phase obtained by adding the phase difference S to the instructed phase θ_ref that is last output before the switching signal is switched from "L" to "H" is output as the instructed phase θ_ref.

Thereafter, the processing returns to step S1001, and the control switcher 515 switches the controller for controlling the driving of the motor 509. Specifically, the control switcher 515 switches the switching signal from "L" to "H" in such a way as to switch the controller for controlling the motor 509 from the vector controller 518 to the constant current controller 517, and outputs the switching signal. The delay circuit 519 outputs the input switching signal to the selector switches 516a, 516b, and 516c after the predetermined delay time from the time of the output of the switching signal from the control switcher 515. Consequently, the state of each of the selector switches 516a, 516b, and 516c is switched, and the constant current controller 517 performs the constant current control.

Thereafter, the motor control apparatus 157 repeatedly performs the above-described control until the CPU 151a outputs the enable signal "L" to the motor control apparatus 157. In the case in which the CPU 151a outputs the enable signal "L" to the motor control apparatus 157, even if the vector control is being performed, the motor control apparatus 157 stops controlling the motor 509.

As described above, in the present embodiment, the command generator 500 adjusts the instructed phase θ_ref to be output at the time of switching the motor control method from the constant current control to the vector control. Specifically, if the switching signal input from the control switcher 515 is switched from "H" to "L", the command generator 500 (command value generator 500b) outputs, as the instructed phase θ_ref, the rotation phase θ that is last input before the switching signal is switched from "H" to "L". In this way, the rotation speed of the motor 509 is prevented from fluctuating due to a decrease of the phase difference between the command phase and the rotation phase of the rotor 402 at the time of switching the motor control method from the constant current control to the vector control. In other words, motor control is prevented from becoming unstable at the time of switching the control mode for motor control.

Further, the command generator 500 adjusts the instructed phase θ_ref at the time of switching the motor control method from the vector control to the constant current control. Specifically, the command value generator 500b outputs, as the instructed phase θ_ref, a phase obtained by adding the phase difference S to the instructed phase θ_ref that is last output before the switching signal is switched from "L" to "H". In this way, the rotation speed of the motor 509 is prevented from fluctuating due to an increase of the phase difference between the instructed phase and the rotation phase of the rotor 402 at the time of switching the motor control method from the vector control to the constant current control. Specifically, motor control is prevented from becoming unstable at the time of switching the control mode for motor control.

In the present embodiment, the command generator 500 adjusts the instructed phase θ_ref as described below at the time of switching the motor control method from the vector control to the constant current control. Specifically, while the command generator 500 outputs, as the instructed phase θ_ref, the phase obtained by adding the phase difference δ stored in the memory 500c to the instructed phase θ_ref that is last output before the switching signal is switched from "L" to "H", the present embodiment is not limited to the foregoing. For example, the command generator 500 can generate the instructed phase θ_ref based on the current value iq that is last converted by the coordinate converter 511 before the switching signal is switched from "L" to "H" and the rotation phase θ determined by the phase determiner 513. Specifically, for example, a table that specifies the relationship between the phase difference (load angle) between the instructed phase θ_ref and the rotation phase θ and the current value iq is stored in the ROM 151b, and the command generator 500 determines the load angle based on the table and the current value iq. Then, the command generator 500 can generate the instructed phase θ_ref by adding the load angle to the rotation phase θ and output the generated instructed phase θ_ref. Further, the command generator 500 can generate the instructed phase θ_ref by adding a phase θ0, which is empirically determined in advance, to the instructed phase θ_ref that is last generated before the switching signal is switched from "L" to "H", and output the generated instructed phase θ_ref. The phase θ0 can be set based on, for example, the load torque applied to the rotor 402 while the constant current control is executed or the load torque applied to the rotor 402 while the vector control is executed.

A second embodiment will be described. Description of the configurations of the image forming apparatus and the motor control apparatus that are similar to those in the first embodiment is omitted.

As described above in the first embodiment, the phase difference δ (load angle) is the value corresponding to the load torque applied to the rotor 402 of the motor 509, and the larger the load torque is, the larger the phase difference δ becomes. For example, in a case in which the load torque at the time point tc2 is larger than the load torque at the time point tc1, the phase difference δ at the time point tc2 is larger than the phase difference δ at the time point tc1.

In a case in which the phase difference δ stored in the memory 500c at the time of switching the control method from the constant current control to the vector control is used as an adjustment amount of the instructed phase θ_ref at the time of switching the control method from the vector control to the constant current control, the following situation can occur. Specifically, for example, if the load torque at the time point tc2 is larger than the load torque at the time point tc1, motor control can become unstable since the torque corresponding to the load angle immediately after the control method is switched from the vector control to the constant current control is less than the load torque. Thus, in the present embodiment, the configuration described below is applied to thereby prevent motor control from becoming unstable at the time of switching the control mode for motor control.

Figure 10:
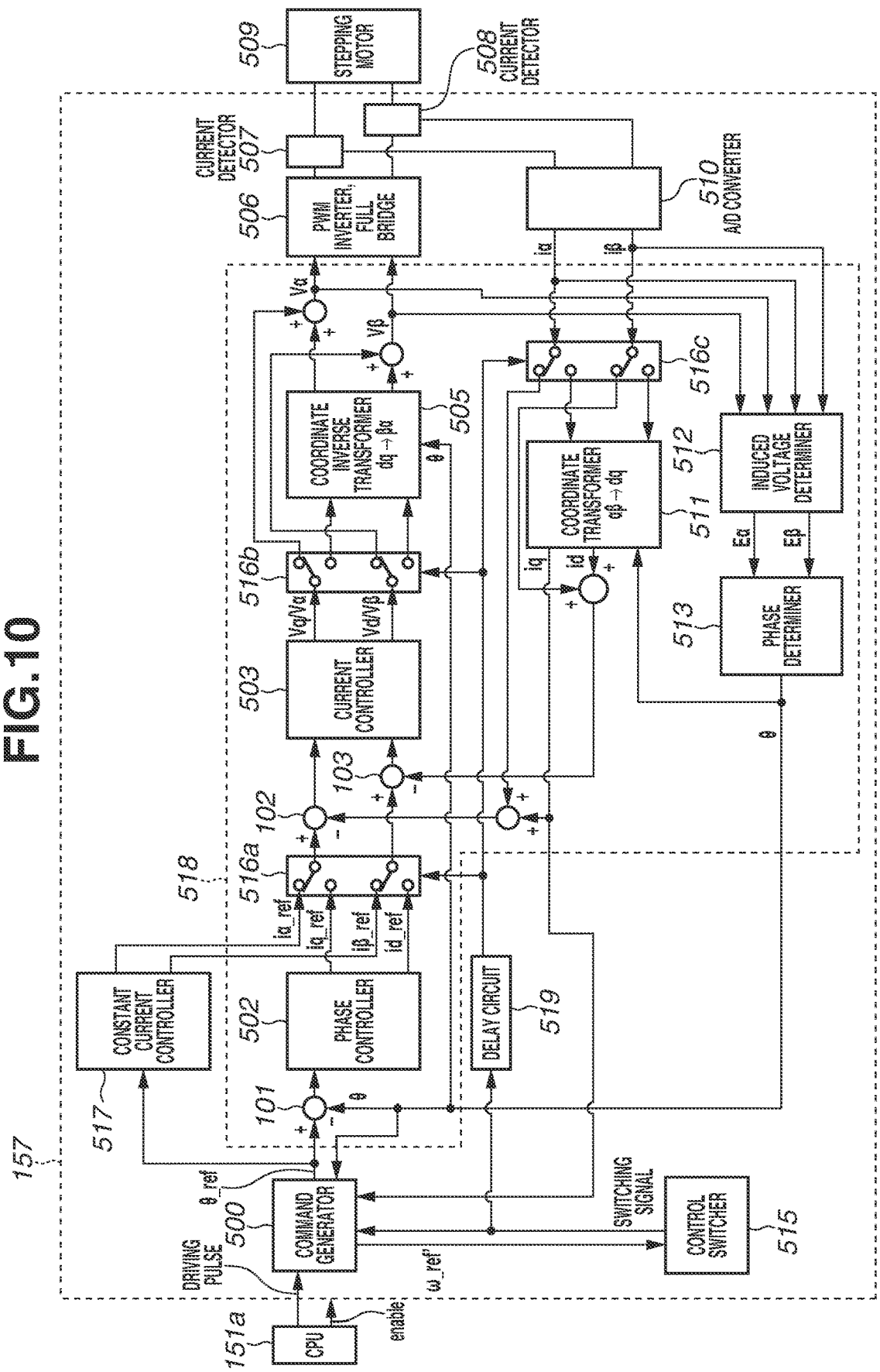
FIG. 10 is a block diagram illustrating an example of a configuration of a motor control apparatus according to a second embodiment.

FIG. 10 is a block diagram illustrating an example of the configuration of the motor control apparatus 157 in the present embodiment. In the present embodiment, as illustrated in FIG. 10, the current value iq output from the coordinate converter 511 is input to the command generator 500.

Figure 11:
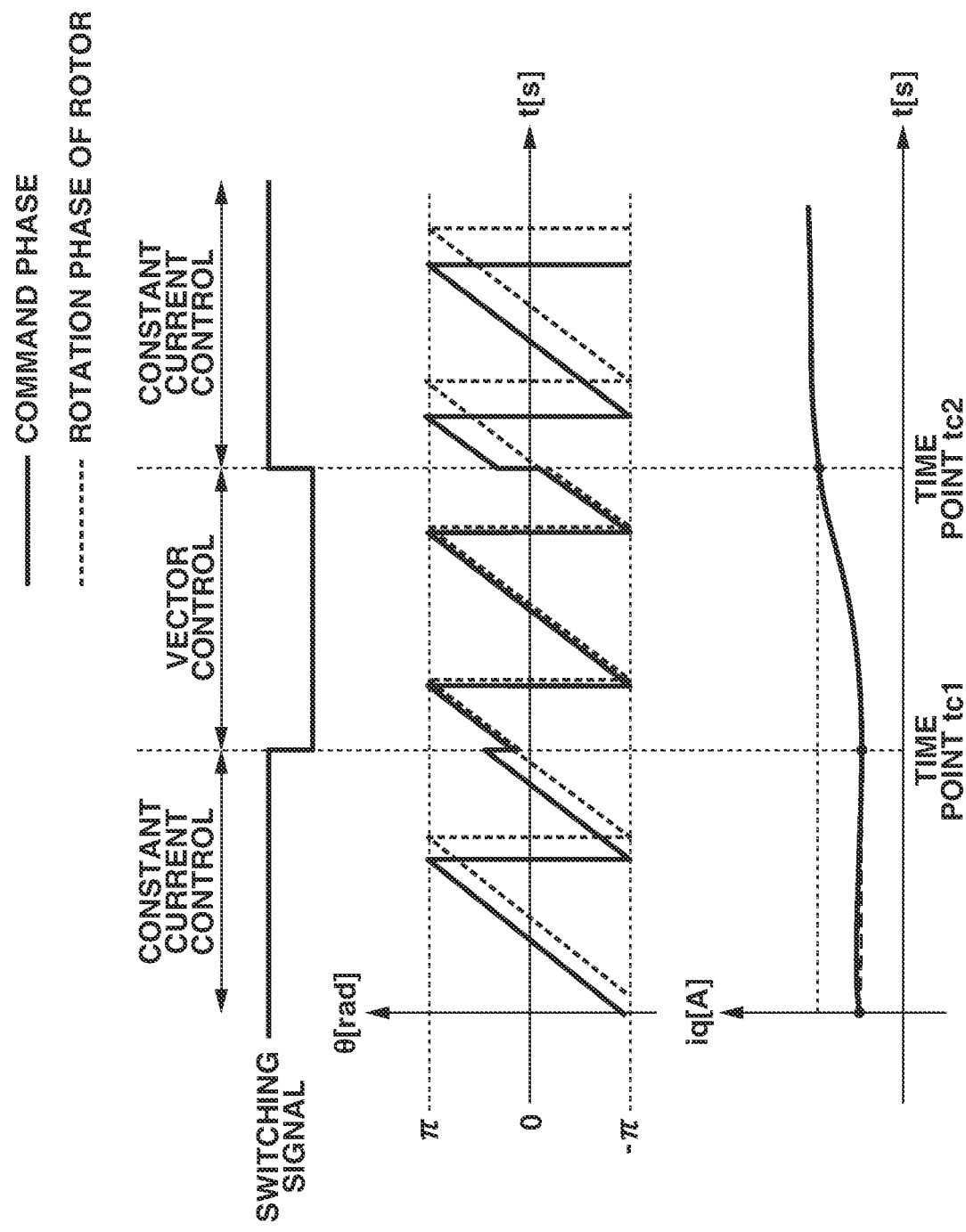
FIG. 11 a diagram illustrating a processing method in switching motor control according to the second embodiment.
Figure 12:
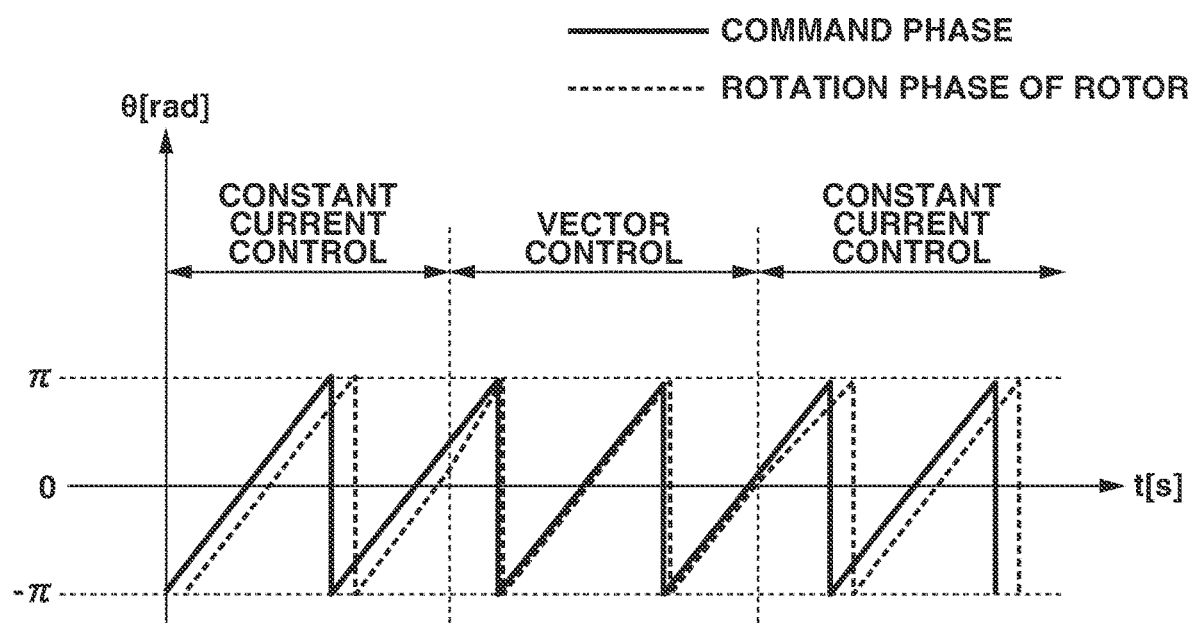
FIG. 12 a diagram illustrating the behavior of a rotation phase in switching motor control.

FIG. 11 illustrates a processing method in switching motor control in the present embodiment. In FIG. 11, the solid line represents the instructed phase θ_ref of the motor 509, whereas the broken line represents the rotation phase θ of the rotor 402.

In the present embodiment, if the switching signal is switched from "H" to "L", the command value generator 500b outputs, as the instructed phase θ_ref, the rotation phase θ that is last input before the switching signal is switched from "H" to "L". The command value generator 500b stores, in the memory 500c, the phase difference δ between the rotation phase θ that is last input before the switching signal is switched from "H" to "L" and the instructed phase θ_ref that is last output before the switching signal is switched from "H" to "L". Further, if the switching signal is switched from "H" to "L", the command value generator 500b stores, in the memory 500c, the current value iq that is last input before the switching signal is switched from "H" to "L", as a current value iq1.

If the switching signal is switched from "L" to "H", the command value generator 500b generates a phase θ' based on the phase difference δ and the current value iq1 stored in the memory 500c and a current value iq2 that is last input before the switching signal is switched from "L" to "H". Then, the command value generator 500b outputs, as the instructed phase θ_ref, a phase obtained by adding the phase θ' to the instructed phase θ_ref that is last output before the switching signal is switched from "L" to "H". The command value generator 500b generates the phase θ' based on formula (12) below.

$$\theta' = \delta * iq2/iq1 \quad (12)$$

Thereafter, the command value generator 500b generates the instructed phase θ_ref based on a pulse signal input from the CPU 151a using the instructed phase θ_ref to which the phase θ' is added as an initial value, and outputs the instructed phase θ_ref.

The predetermined delay time by which the switching signal is delayed by the delay circuit 519 from the time of the output of the switching signal from the control switcher 515 is longer than the length of time during which the command value generator 500b performs the above-described processing and shorter than the period at which the switching signal is output from the control switcher 515.

In the present embodiment, the command value generator 500b determines an adjustment amount (phase θ') of the instructed phase θ_ref based on the current values iq1 and iq2 and the phase difference δ as described above. Specifically, the command value generator 500b adjusts the instructed phase θ_ref by adding, to the instructed phase θ_ref, the phase θ' obtained by multiplying the phase difference δ by the ratio of the current value iq2 to the current value iq1. In this way, motor control is prevented from becoming unstable at the time of switching the control method from the vector control to the constant current control even in the case in which the load torque at the time point tc2 is larger than the load torque at the time point tc1. Specifically, motor control is prevented from becoming unstable at the time of switching the control mode for motor control.

While the command value generator 500b outputs, as the instructed phase θ_ref, the rotation phase θ that is last input before the switching signal is switched from "H" to "L" at the time switching the control method from the constant current control to the vector control in the first and second embodiments, the configuration not limited to the foregoing. For example, the command value generator 500b can output, as the instructed phase θ_ref, a phase delayed from the instructed phase θ_ref that is last output before the switching signal is switched from "H" to "L" and advanced from the rotation phase θ that is last input before the switching signal is switched from "H" to "L". The instructed phase θ_ref output at this time is determined based on, for example, the input rotation phase θ such that the phase is advanced by a predetermined amount from the rotation phase θ that is last input before the switching signal is switched from "H" to "L".

The command value generator 500b can generate the instructed phase θ_ref to be output based on the torque current component (current value iq) of the driving current that is last detected before the switching signal is switched from "H" to "L", and output the generated instructed phase θ_ref. Specifically, for example, the command value generator 500b can generate the instructed phase θ_ref based on the table that is stored in the ROM 151b and specifies the relationship between the phase difference (load angle) between the instructed phase θ_ref and the rotation phase θ and the current value iq and the current value iq, and output the generated instructed phase θ_ref.

Further, the command value generator 500b can correct the instructed phase θ_ref based on formula (13) below and output the corrected phase θ_ref as the instructed phase θ_ref.

$$\theta\_ref' = \theta\_ref - \theta c \quad (13)$$

The correction value θc is, for example, a value that is stored in advance in the ROM 151b and preset based on the load torque applied to the rotor 402 of the motor 509 due to the load driven by the motor 509. The correction value θc is set such that, for example, the corrected phase θ_ref is a phase delayed from the instructed phase θ_ref that is last output before the switching signal is switched from "H" to "L", and advanced from the rotation phase θ that is last input before the switching signal is switched from "H" to "L".

While the speed generator 500a generates the rotation speed ω_ref based on the time interval between the edges of falls of the continuous driving pulse in the first and second embodiments, the configuration is not limited to the foregoing. For example, the CPU 151a can generate the rotation speed ω_ref based on a predetermined motor operation sequence and output the generated rotation speed ω_ref to the control switcher 515 with a predetermined period.

The circuit that controls the driving of the motor 509 using the vector controller 518 in the first and second embodiments corresponds to a first control circuit in the present disclosure. Further, the circuit that controls the driving of the motor 509 using the constant current controller 517 in the first and second embodiments corresponds to a second control circuit in the present disclosure.

While the stepping motor is used as the motor to drive the loads in the first and second embodiments, any other motor such as a direct-current (DC) motor can be used. Further, the motor is not limited to a two-phase motor, and the first and second embodiments are applicable to any other motor such as a three-phase motor.

While the permanent magnet is used as the rotor in the first and second embodiments, the rotor is not limited to that described herein.

An embodiment of the present disclosure is capable of preventing motor control from becoming unstable at the time of switching a control mode for motor control.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-026352, filed Feb. 16, 2018, which is hereby incorporated by reference herein in its entirety.

What is claimed is:

1. A motor control apparatus to control a motor based on an instructed phase indicating a target phase of a rotor of the motor, the motor control apparatus comprising:
    a detector configured to detect a driving current flowing through a winding of the motor;
    a phase determiner configured to determine a rotation phase of the rotor based on the driving current detected by the detector;
    a generator configured to generate the instructed phase; and
    a controller including a first control mode, in which the motor is controlled by controlling the driving current flowing through the winding of the motor based on a value of a torque current component such that a deviation between the instructed phase generated by the generator and the rotation phase determined by the phase determiner is reduced, and a second control mode in which the motor is controlled based on a current of a predetermined magnitude, wherein the torque current component is expressed in a rotating coordinate system based on the rotation phase determined by the phase determiner,
    wherein the phase determiner is configured to determine the rotation phase even while the second control mode is executed, and
    wherein the generator generates, based on the rotation phase determined by the phase determiner while the second control mode is executed, the instructed phase in the first control mode in a case where a control mode for controlling the driving current is switched from the second control mode to the first control mode.

2. The motor control apparatus according to claim 1, further comprising a pulse generator configured to generate a pulse train,
    wherein the generator updates the instructed phase by adding a predetermined amount of change to the instructed phase each time a pulse of the pulse train output from the pulse generator is input.

3. The motor control apparatus according to claim 2, wherein, in the case where the control mode for controlling the driving current is to be switched from the second control mode to the first control mode, an initial phase of the instructed phase in the first control mode is set based on the rotation phase determined by the phase determiner while the second control mode is executed.

4. The motor control apparatus according to claim 3,
    wherein the detector is configured to detect the driving current with a predetermined period,
    wherein the phase determiner determines the rotation phase based on the driving current detected by the detector, and
    wherein the initial phase of the instructed phase in the first control mode is set based on the rotation phase that is last determined by the phase determiner before the control mode is switched from the second control mode to the first control mode.

5. The motor control apparatus according to claim 2,
    wherein the controller includes a speed determiner configured to determine a rotation speed corresponding to a target speed of the rotor based on a frequency of the pulse train output from the pulse generator, and
    wherein, in a case where the rotation speed determined by the speed determiner exceeds a predetermined value, the controller switches the control mode for controlling the driving current from the second control mode to the first control mode.

6. The motor control apparatus according to claim 5, wherein the speed determiner is configured to determine the rotation speed corresponding to the target speed each time a pulse of the pulse train is input from the pulse generator.

7. The motor control apparatus according to claim 1, further comprising an induced voltage determiner configured to determine a magnitude of an induced voltage induced each in a winding of a first phase and a winding of a second phase by rotation of the rotor,
wherein, in a case where the induced voltage determiner determines the magnitude of the induced voltage of the first phase and the magnitude of the induced voltage of the second phase, the phase determiner determines the rotation phase of the rotor based on the magnitude of the determined induced voltage of the first phase and the determined magnitude of the induced voltage of the second phase.

8. The motor control apparatus according to claim 7, wherein, in a case where the induced voltage determiner determines a magnitude of an induced voltage of the first phase and a magnitude of an induced voltage of the second phase, the predetermined value is set to the rotation speed from which the rotation phase of the rotor of the motor is determinable by the phase determiner based on the determined magnitude of an induced voltage of the first phase and the determined magnitude of an induced voltage of the second phase.

9. The motor control apparatus according to claim 1, further comprising a storage unit configured to store a phase difference between the instructed phase that is last generated by the generator before the control mode for controlling the driving current is switched from the second control mode to the first control mode and the rotation phase determined by the phase determiner,
wherein, in a case where the control mode for controlling the driving current is to be switched from the first control mode to the second control mode, an initial phase of the instructed phase in the second control mode is set based on the instructed phase that is last generated by the generator before the control mode is switched from the first control mode to the second control mode and the phase difference stored in the storage unit.

10. The motor control apparatus according to claim 1, wherein the detector is configured to detect the driving current with a predetermined period,
wherein the motor control apparatus further includes a second storage unit configured to store the value of the torque current component of the driving current that is last detected by the detector before the control mode for controlling the driving current is switched from the second control mode to the first control mode, and
wherein, in a case where the control mode for controlling the driving current is to be switched from the first control mode to the second control mode, an initial phase of the instructed phase in the second control mode is set based on the value of the torque current component of the driving current that is last detected by the detector before the control mode is switched from the first control mode to the second control mode and the value of the torque current component stored in the second storage unit.

11. The motor control apparatus according to claim 1, wherein the first control mode is a control mode in which the motor is controlled by controlling a value of an excitation current component of the driving current detected by the detector such that the value is adjusted to zero and by controlling the value of the torque current component of the driving current detected by the detector.

12. The motor control apparatus according to claim 1, further comprising:
a first control circuit configured to supply the driving current to each of a winding of a first phase of the motor and a winding of a second phase of the motor in a case where the first control mode is executed;
a second control circuit configured to supply the driving current to each of the winding of the first phase of the motor and the winding of the second phase of the motor in the case where the second control mode is executed; and
a switching unit configured to switch between control of the motor using the first control circuit and control of the motor using the second control circuit.

13. A motor control apparatus to control a motor based on an instructed phase indicating a target phase of a rotor of the motor, the motor control apparatus comprising:
a detector configured to detect a driving current flowing through a winding of the motor;
a phase determiner configured to determine a rotation phase of the rotor based on the driving current detected by the detector;
a generator configured to generate the instructed phase; and
a controller including a first control mode, in which the motor is controlled by controlling the driving current flowing through the winding of the motor based on a value of a torque current component such that a deviation between the instructed phase generated by the generator and the rotation phase determined by the phase determiner is reduced, and a second control mode in which the motor is controlled based on a current of a predetermined magnitude, wherein the torque current component is expressed in a rotating coordinate system based on the rotation phase determined by the phase determiner,
wherein the generator generates, based on a load torque applied to the rotor, the instructed phase in the second control mode in a case where a control mode for controlling the driving current is switched from the first control mode to the second control mode.

14. The motor control apparatus according to claim 13, wherein the generator generates, based on the value of the torque current component of the driving current detected by the detector while the first control mode is executed, the instructed phase in the second control mode in the case where control mode for controlling the driving current is switched from the first control mode to the second control mode.

15. A sheet conveyance apparatus comprising:
a conveyance roller configured to convey a sheet;
a motor configured to drive the conveyance roller; and
the motor control apparatus according to claim 1,
wherein the motor control apparatus is configured to control driving of the motor which drives the conveyance roller.

16. A document feeding apparatus comprising:
a sheet conveyance apparatus having:
a conveyance roller configured to convey a sheet,
a motor configured to drive the conveyance roller, and
the motor control apparatus according to claim 1,
wherein the motor control apparatus is configured to control driving of the motor which drives the conveyance roller; and a document stacking portion on which a document is to be stacked, wherein the sheet conveyance apparatus is configured to feed the document stacked on the document stacking portion.

17. A document reading apparatus comprising:

a document feeding apparatus having a sheet conveyance apparatus and a document stacking portion on which a document is to be stacked, wherein the sheet conveyance apparatus includes:

a conveyance roller configured to convey a sheet, a motor configured to drive the conveyance roller, and the motor control apparatus according to claim 1, wherein the motor control apparatus is configured to control driving of the motor which drives the conveyance roller, and wherein the sheet conveyance apparatus is configured to feed the document stacked on the document stacking portion; and a reading unit configured to read the document fed by the document feeding apparatus.

18. An image forming apparatus comprising:

a sheet conveyance apparatus having:

a conveyance roller configured to convey a sheet, a motor configured to drive the conveyance roller, and the motor control apparatus according to claim 1, wherein the motor control apparatus is configured to control driving of the motor which drives the conveyance roller; and an image forming unit configured to form an image on a recording medium conveyed by the sheet conveyance apparatus.

19. An image forming apparatus to form an image on a recording medium, the image forming apparatus comprising:

a motor configured to drive a load; and the motor control apparatus according to claim 1, wherein the motor control apparatus is configured to control driving of the motor which drives the load.

* * * * *